US012619659B2

(12) United States Patent
Chae et al.

(10) Patent No.: US 12,619,659 B2
(45) Date of Patent: May 5, 2026

(54) METHOD, SERVICE SERVER AND COMPUTER-READABLE MEDIUM FOR MATCHING MUSIC USAGE LOG AND COPYRIGHT HOLDER

(71) Applicant: Gee Byoung Chae, Seoul (KR)

(72) Inventors: Gee Byoung Chae, Seoul (KR); ChangJoon Lee, Uiwang-si (KR)

( * ) Notice: Subject to any disclaimer, the term of this patent is extended or adjusted under 35 U.S.C. 154(b) by 89 days.

(21) Appl. No.: 18/346,930

(22) Filed: Jul. 5, 2023

(65) Prior Publication Data

US 2024/0012855 A1     Jan. 11, 2024

(30) Foreign Application Priority Data

Jul. 6, 2022     (KR) ......................... 10-2022-0082850

(51) Int. Cl.
*G06F 16/683* (2019.01)
*G06F 16/68* (2019.01)
*G06F 21/62* (2013.01)

(52) U.S. Cl.
CPC .......... *G06F 16/683* (2019.01); *G06F 16/686* (2019.01); *G06F 21/6218* (2013.01)

(58) Field of Classification Search
CPC ........................... G06F 21/6218; G06F 16/683
See application file for complete search history.

(56) References Cited

U.S. PATENT DOCUMENTS 8,634,947 B1 * 1/2014 Kleinpeter ............ G06F 16/683
                                                                700/94
2012/0124638 A1 * 5/2012 King ................ H04N 21/23418
                                                                726/1

* cited by examiner

*Primary Examiner* — Carolyn R Edwards
*Assistant Examiner* — Dylan Maguire Neece
(74) *Attorney, Agent, or Firm* — Youngil Lee

(57) ABSTRACT

The present invention relates to a method, a service server and a computer-readable medium for matching a music usage log (cue sheet) and a copyright holder, and more particularly, to a method, a service server and a computer-readable medium for matching a music usage log (cue sheet) and a copyright holder, in which the service server includes a master DB including a plurality of right logs, receives a usage log for music usage from a streaming server, derives a preliminary right log by preprocessing the usage log, calculates a music name matching rate, an artist name matching rate, and an album name matching rate based on the preliminary right log and the right log to match the preliminary right log and the right log, and adds up a record value of the preliminary right log to a cumulative record value of the right log.

4 Claims, 14 Drawing Sheets

FIG. 1B

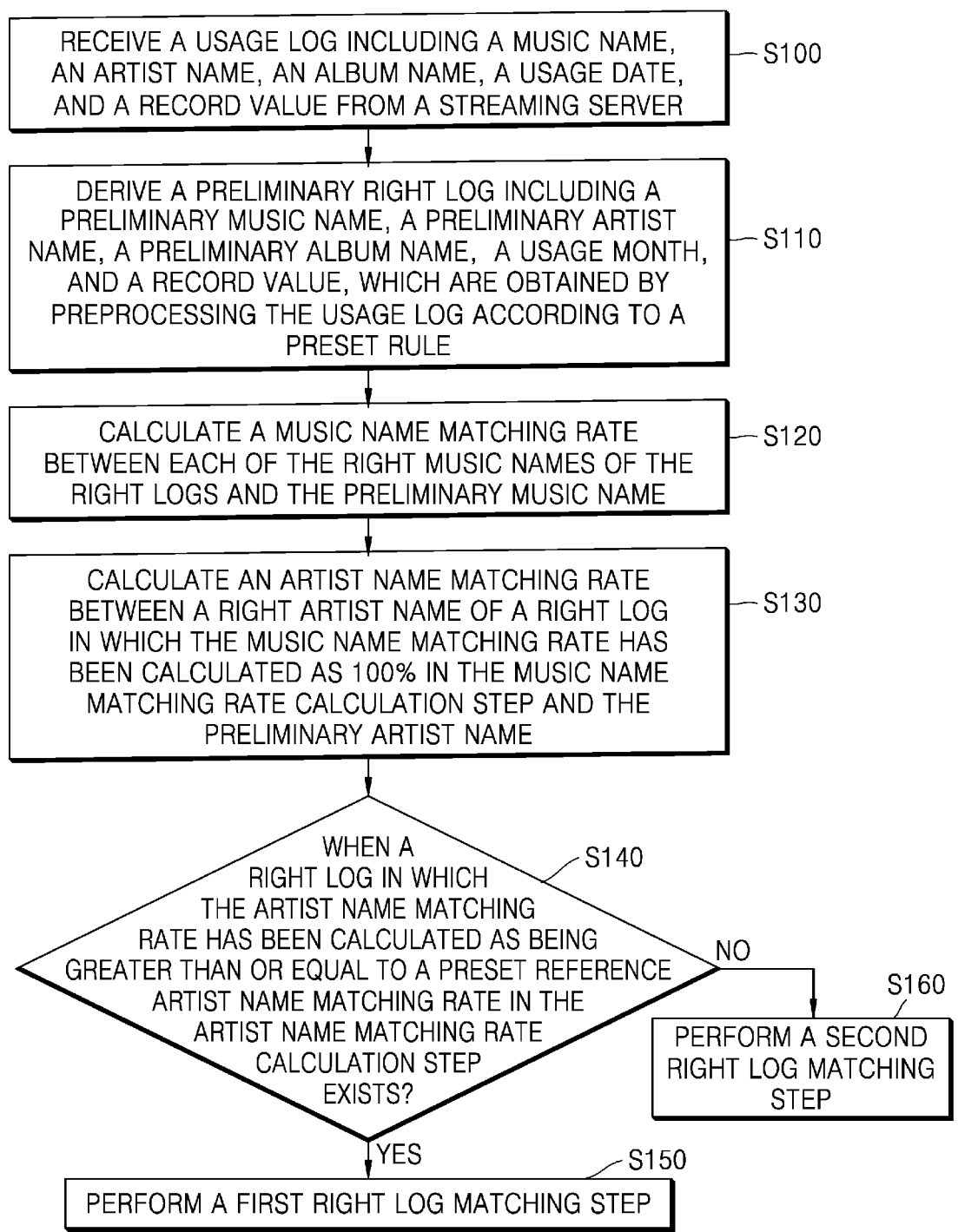

RECEIVE A USAGE LOG INCLUDING A MUSIC NAME, AN ARTIST NAME, AN ALBUM NAME, A USAGE DATE, AND A RECORD VALUE FROM A STREAMING SERVER — S100

DERIVE A PRELIMINARY RIGHT LOG INCLUDING A PRELIMINARY MUSIC NAME, A PRELIMINARY ARTIST NAME, A PRELIMINARY ALBUM NAME, A USAGE MONTH, AND A RECORD VALUE, WHICH ARE OBTAINED BY PREPROCESSING THE USAGE LOG ACCORDING TO A PRESET RULE — S110

CALCULATE A MUSIC NAME MATCHING RATE BETWEEN EACH OF THE RIGHT MUSIC NAMES OF THE RIGHT LOGS AND THE PRELIMINARY MUSIC NAME — S120

CALCULATE AN ARTIST NAME MATCHING RATE BETWEEN A RIGHT ARTIST NAME OF A RIGHT LOG IN WHICH THE MUSIC NAME MATCHING RATE HAS BEEN CALCULATED AS 100% IN THE MUSIC NAME MATCHING RATE CALCULATION STEP AND THE PRELIMINARY ARTIST NAME — S130

WHEN A RIGHT LOG IN WHICH THE ARTIST NAME MATCHING RATE HAS BEEN CALCULATED AS BEING GREATER THAN OR EQUAL TO A PRESET REFERENCE ARTIST NAME MATCHING RATE IN THE ARTIST NAME MATCHING RATE CALCULATION STEP EXISTS? — S140

NO → PERFORM A SECOND RIGHT LOG MATCHING STEP — S160

YES → PERFORM A FIRST RIGHT LOG MATCHING STEP — S150

| MUSIC COPYRIGHT HOLDER | RIGHT MUSIC NAME | RIGHT ARTIST NAME | RIGHT ALBUM NAME | CUMULATIVE RECORD VALUE |
|---|---|---|---|---|
| A | | | | |
| | | | | |
| | | | | |
| B | | | | |
| ⋮ | ⋮ | ⋮ | ⋮ | ⋮ |

USAGE LOG

| MUSIC NAME | ARTIST NAME | ALBUM NAME | USAGE DATE | RECORD VALUE |
|---|---|---|---|---|
| A | B | C | YYYY/ MM/DD HH : SS | N |

PREPROCESSING

PRELIMINARY RIGHT LOG

| PRELIMINARY MUSIC NAME | PRELIMINARY ARTIST NAME | PRELIMINARY ALBUM NAME | USAGE MONTH | RECORD VALUE |
|---|---|---|---|---|
| A' | B' | C' | YYYY/MM | N |

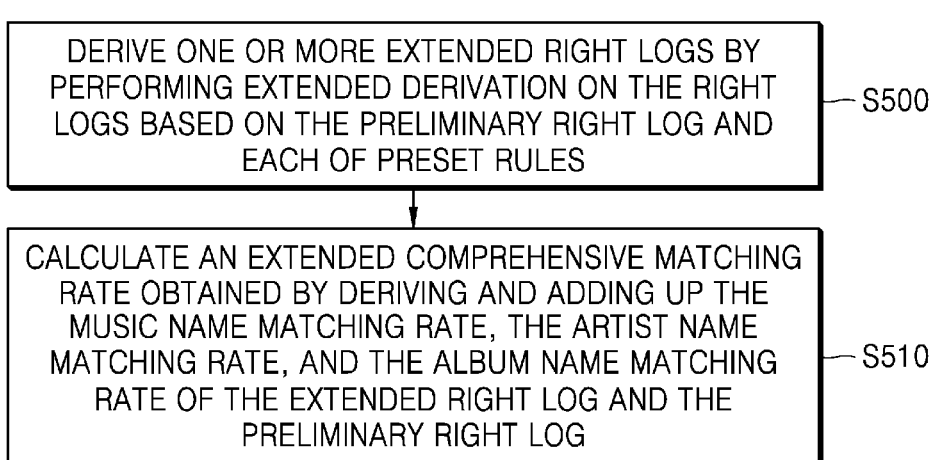

DERIVE ONE OR MORE EXTENDED RIGHT LOGS BY
PERFORMING EXTENDED DERIVATION ON THE RIGHT
LOGS BASED ON THE PRELIMINARY RIGHT LOG AND
EACH OF PRESET RULES — S500

CALCULATE AN EXTENDED COMPREHENSIVE MATCHING
RATE OBTAINED BY DERIVING AND ADDING UP THE
MUSIC NAME MATCHING RATE, THE ARTIST NAME
MATCHING RATE, AND THE ALBUM NAME MATCHING
RATE OF THE EXTENDED RIGHT LOG AND THE
PRELIMINARY RIGHT LOG — S510

FIG. 7B

FIG. 9A
NUMBER OF
CHARACTERS IN
CHARACTER STRING
RIGHT LOG : a b c c d e ----- 6
PRELIMINARY RIGHT LOG : a b d ----- 3
$$\Rightarrow \frac{2}{6} \times 100 = 33.3\%$$
FIG. 9B
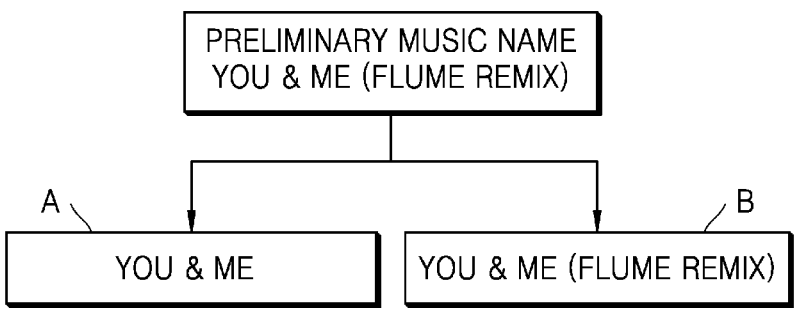
PRELIMINARY MUSIC NAME
YOU & ME (FLUME REMIX)
A — YOU & ME
B — YOU & ME (FLUME REMIX)
FIG. 9C          FIG. 9D
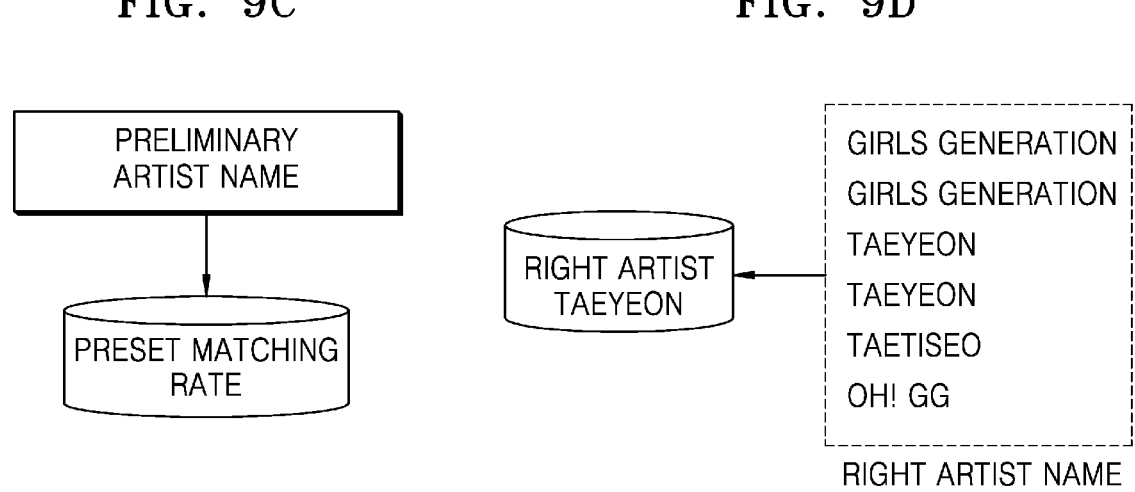
PRELIMINARY
ARTIST NAME
PRESET MATCHING
RATE
RIGHT ARTIST
TAEYEON
GIRLS GENERATION
GIRLS GENERATION
TAEYEON
TAEYEON
TAETISEO
OH! GG
RIGHT ARTIST NAME

FIG. 10

| Music copyright holder | Right music name | Right artist name | Right album name | Cumulative record value | Release date | Release record label |
|---|---|---|---|---|---|---|
| A | | | | | | |
| | | | | | | |
| | | | | | | |
| B | | | | | | |
| ⋮ | ⋮ | ⋮ | ⋮ | ⋮ | ⋮ | ⋮ |

METHOD, SERVICE SERVER AND COMPUTER-READABLE MEDIUM FOR MATCHING MUSIC USAGE LOG AND COPYRIGHT HOLDER

BACKGROUND OF THE INVENTION

1. Field of the Invention

The present invention relates to a method, a service server and a computer-readable medium for matching a music usage log (cue sheet) and a copyright holder, and more particularly, to a method, a service server and a computer-readable medium for matching a music usage log (cue sheet) and a copyright holder, in which the service server includes a master DB including a plurality of right logs, receives a usage log for music usage from a streaming server including a monitoring server, derives a preliminary right log by preprocessing the usage log, calculates a music name matching rate, an artist name matching rate, and an album name matching rate based on the preliminary right log and the right log to match the preliminary right log and the right log, and adds up a record value of the preliminary right log to a cumulative record value of the right log.

2. Description of the Related Art

Music refers to digital music data that may be downloaded or live-streamed so as to be played. In order to create the music, a songwriter, a lyricist, an arranger, a producer, a performer, and the like may participate, and have copyrights or neighboring rights.

As they hold the copyrights or the neighboring rights, when the music is used, they may have a right to get a settlement for an income caused by music usage.

In commercial media such as broadcast programs, advertisements, and movies, copyrighted music has been widely used, and the music has been streamed by many people through a streaming service. According to Spotify, which is a music streaming medium, during 2021, K-pop music was streamed a monthly average of 7.97 billion times or more worldwide.

Accordingly, there is a demand for a system capable of accurately settling an income generated by usage of a large quantity of music.

In particular, reproduction rights (downloading), transmission rights (streaming), and performing rights (play) are important rights in the online music industry, and it is important to collect usage and sales logs to perform settlement and distribution. In addition, royalties for broadcasting are also a main source of income for copyright holders, so that it is also important to monitor copyrighted works used in the broadcasting to perform settlement and distribution.

In order to perform music income settlement, it is necessary to know the number of times the music has been used and a right holder of the music. However, there are many difficulties in retrieving the right holder of the music.

For example, a title of the same music and the same artist may be variously notated according to distributors or the like, and even the same music may belong to various albums.

Therefore, in order to accurately retrieve the right holder of the music to get a settlement for an income, there is a demand for a system capable of receiving information on usage of the music, preprocessing the received information, and matching the preprocessed information with prestored information on the music.

SUMMARY OF THE INVENTION

The present invention relates to a method, a service server and a computer-readable medium for matching a music usage log (cue sheet) and a copyright holder, and more particularly, to a method, a service server and a computer-readable medium for matching a music usage log (cue sheet) and a copyright holder, in which the service server includes a master DB including a plurality of right logs, receives a usage log for music usage from a streaming server, derives a preliminary right log by preprocessing the usage log, calculates a music name matching rate, an artist name matching rate, and an album name matching rate based on the preliminary right log and the right log to match the preliminary right log and the right log, and adds up a record value of the preliminary right log to a cumulative record value of the right log.

To achieve the object described above, according to one embodiment of the present invention, there is provided a method for matching a music usage log (cue sheet) and a copyright holder, which is performed by a service server, wherein the service server includes a master DB, the master DB stores a plurality of right logs identified by a music copyright holder of right music, each of the right logs includes a right music name, a right artist name, and a right album name of the right music, and a cumulative record value obtained by accumulating a record value, which is a number of usage times of the right music, on a monthly basis, and the service server performs: a usage log reception step of receiving a usage log including a music name, an artist name, an album name, a usage date, and a record value for used music from a streaming server; a preliminary right log derivation step of deriving a preliminary right log including a preliminary music name, a preliminary artist name, a preliminary album name, a usage month, and a record value, which are obtained by preprocessing the usage log according to a preset rule; a music name matching rate calculation step of calculating a music name matching rate between each of the right music names of the right logs and the preliminary music name; an artist name matching rate calculation step of calculating an artist name matching rate between a right artist name of a right log in which the music name matching rate has been calculated as 100% in the music name matching rate calculation step and the preliminary artist name; and a first right log matching step of calculating, when a right log in which the artist name matching rate has been calculated as being greater than or equal to a preset reference artist name matching rate in the artist name matching rate calculation step exists, an album name matching rate between each of the right album names of the right logs and the preliminary album name, deriving a matching right log matched with the preliminary right log based on the artist name matching rate and the album name matching rate, and adding up the record value of the preliminary right log to the cumulative record value of the matching right log.

According to one embodiment of the present invention, the first right log matching step may include: a first preliminary matching right log derivation step of calculating the album name matching rate between each of the right album names of the right logs in which the artist name matching rate has been calculated as being greater than or equal to the preset reference artist name matching rate and the preliminary album name, and deriving a right log corresponding to the album name matching rate that is greater than or equal to a preset reference album name matching rate as a first preliminary matching right log; and a first matching step of deriving one of first preliminary matching right logs as the matching right log based on the artist name matching rate and the album name matching rate of each of the first preliminary matching right logs, and adding up the record value of the preliminary right log to the cumulative record value of the matching right log according to the usage month.

According to one embodiment of the present invention, in the method for matching the music usage log and the copyright holder, the service server may perform a second right log matching step when a right log in which the artist name matching rate has been calculated as being greater than or equal to the preset reference artist name matching rate in the artist name matching rate calculation step does not exist, and the second right log matching step may include: a second preliminary matching right log derivation step of calculating the album name matching rate between each of the right album names of the right logs in which the artist name matching rate has been calculated and the preliminary album name, deriving one second preliminary matching right log based on the artist name matching rate and the album name matching rate of each of the right logs corresponding to the album name matching rate that is greater than or equal to a preset reference album name matching rate, calculating and storing a comprehensive matching rate obtained by adding up the music name matching rate, the artist name matching rate, and the album name matching rate of the second preliminary matching right log, and assigning a preset setting comprehensive matching rate to the second preliminary matching right log; an extended right log derivation step of deriving one or more extended right logs by performing extended derivation on the right logs based on the preliminary right log and the preset rule, and calculating an extended comprehensive matching rate obtained by deriving and adding up the music name matching rate, the artist name matching rate, and the album name matching rate of the extended right log and the preliminary right log; a second matching step of comparing the setting comprehensive matching rate with an extended comprehensive matching rate corresponding to a largest value among the extended comprehensive matching rates of the one or more extended right logs to derive, when the setting comprehensive matching rate is less than the extended comprehensive matching rate, an extended right log corresponding to the largest value among the extended comprehensive matching rates as the matching right log, and add up the record value of the preliminary right log to the cumulative record value of the matching right log according to the usage month; a matching rate comparison step of comparing the setting comprehensive matching rate with the extended comprehensive matching rate corresponding to the largest value among the extended comprehensive matching rates of the one or more extended right logs to compare, when the setting comprehensive matching rate is greater than the extended comprehensive matching rate, the setting comprehensive matching rate and the comprehensive matching rate of the second preliminary matching right log; a non-matching step of storing, when the setting comprehensive matching rate is greater than the comprehensive matching rate in the matching rate comparison step, the preliminary right log in the master DB as non-matching without deriving the second preliminary matching right log as the matching right log; and a third matching step of deriving, when the setting comprehensive matching rate is less than the comprehensive matching rate in the matching rate comparison step, the second preliminary matching right log as the matching right log, and adding up the record value of the preliminary right log to the cumulative record value of the matching right log according to the usage month.

According to one embodiment of the present invention, the preset rule used to derive the extended right log may correspond to one or more of a first rule, a second rule, and a third rule, the first rule may correspond to a rule in which one of the right music name and the preliminary music name includes a remaining one of the right music name and the preliminary music name, the second rule may correspond to a rule in which the right music name and the preliminary music name match each other, and one of the right artist name and the preliminary artist name includes a remaining one of the right artist name and the preliminary artist name, and the third rule may correspond to a rule in which the right music name and the preliminary music name match each other, and one of the right album name and the preliminary album name includes a remaining one of the right album name and the preliminary album name.

According to one embodiment of the present invention, the music name matching rate may be a value obtained by calculating a matching percentage for a short character string based on a long character string when lengths of character strings of the right music name and the preliminary music name are compared with each other, in which when the preliminary music name includes additional information, the calculation is performed by using the preliminary music name with or without the additional information; the artist name matching rate may be a value obtained by calculating a matching percentage for a short character string based on a long character string when lengths of character strings of the right artist name and the preliminary artist name are compared with each other, in which when the preliminary artist name is Various Artist, a preset matching rate is assigned, the right artist name corresponds to one of a plurality of prestored notations for a right artist, and when the preliminary artist name includes additional information, the calculation is performed by using the preliminary artist name with or without the additional information; and the album name matching rate may be a value obtained by calculating a matching percentage of a short character string based on a long character string when lengths of character strings of the right album name and the preliminary album name are compared with each other.

To achieve the object described above, according to one embodiment of the present invention, there is provided a service server, which includes a master DB and performs a method for matching a music usage log (cue sheet) and a copyright holder, in which the master DB stores a plurality of right logs identified by a music copyright holder of right music, and each of the right logs includes a right music name, a right artist name, and a right album name of the right music, and a cumulative record value obtained by accumulating a record value, which is a number of usage times of the right music, on a monthly basis, the service server comprising: a usage log reception unit for receiving a usage log including a music name, an artist name, an album name, a usage date, and a record value for used music from a streaming server; a preliminary right log derivation unit for deriving a preliminary right log including a preliminary music name, a preliminary artist name, a preliminary album name, a usage month, and a record value, which are obtained by standardizing the usage log according to a preset rule; a music name matching rate calculation unit for calculating a music name matching rate between each of the right music names of the right logs and the preliminary music name; an artist name matching rate calculation unit for calculating an artist name matching rate between a right artist name of a right log in which the music name matching rate has been derived as 100% in the music name matching rate calculation unit and the preliminary artist name; and a first right log matching unit when a right log in which the artist name matching rate has been calculated as being greater than or equal to a preset reference artist name matching rate in the artist name matching rate calculation unit exists, wherein the first right log matching unit includes: a first preliminary matching right log derivation unit for calculating an album name matching rate between each of the right album names of the right logs in which the artist name matching rate has been calculated as being greater than or equal to the preset reference artist name matching rate and the preliminary album name, and deriving a right log corresponding to the album name matching rate that is greater than or equal to a preset reference album name matching rate as a first preliminary matching right log; and a first matching unit for deriving one of first preliminary matching right logs as a matching right log based on the artist name matching rate and the album name matching rate of each of the first preliminary matching right logs, and adding up the record value of the preliminary right log to the cumulative record value of the matching right log according to the usage month.

To achieve the object described above, according to one embodiment of the present invention, there is provided a computer-readable medium for implementing a method for matching a music usage log (cue sheet) and a copyright holder, which is performed by a service server, wherein the service server includes a master DB, the master DB stores a plurality of right logs identified by a music copyright holder of right music, each of the right logs includes a right music name, a right artist name, and a right album name of the right music, and a cumulative record value obtained by accumulating a record value, which is a number of usage times of the right music, on a monthly basis, the computer-readable medium stores instructions for allowing the service server to perform: a usage log reception step of receiving a usage log including a music name, an artist name, an album name, a usage date, and a record value for used music from a streaming server; a preliminary right log derivation step of compressing and deriving a preliminary right log including a preliminary music name, a preliminary artist name, a preliminary album name, a usage month, and a record value, which are obtained by standardizing the usage log according to a preset rule; a music name matching rate calculation step of calculating a music name matching rate between each of the right music names of the right logs and the preliminary music name; an artist name matching rate calculation step of calculating an artist name matching rate between a right artist name of a right log in which the music name matching rate has been derived as 100% in the music name matching rate calculation step and the preliminary artist name; and a first right log matching step when a right log in which the artist name matching rate has been calculated as being greater than or equal to a preset reference artist name matching rate in the artist name matching rate calculation step exists, and the first right log matching step includes: a first preliminary matching right log derivation step of calculating an album name matching rate between each of the right album names of the right logs in which the artist name matching rate has been calculated as being greater than or equal to the preset reference artist name matching rate and the preliminary album name, and deriving a right log corresponding to the album name matching rate that is greater than or equal to a preset reference album name matching rate as a first preliminary matching right log; and a first matching step of deriving one of first preliminary matching right logs as a matching right log based on the artist name matching rate and the album name matching rate of each of the first preliminary matching right logs, and adding up the record value of the preliminary right log to the cumulative record value of the matching right log according to the usage month.

According to one embodiment of the present invention, the service server may derive the preliminary right log by preprocessing the usage log, so that the usage log can be matched with a right log for a right holder of the music by accurately defining characteristics and properties of the usage log and ensuring consistency.

According to one embodiment of the present invention, the usage log may be matched with the right log, so that an accurate settlement can be made for the right holder.

According to one embodiment of the present invention, a character string of the preliminary music name may be preprocessed according to a format of the right music name, so that a matching rate can be calculated more accurately.

According to one embodiment of the present invention, the record value of the preliminary right log may be added up on a monthly basis, so that it is possible to respond to music income settlement on a monthly basis.

According to one embodiment of the present invention, the extended derivation may be performed on a right log that has not been a target in the previous steps, so that matching can be performed on a right log that has been omitted by an existing algorithm.

According to one embodiment of the present invention, the preliminary right log in a non-matching state may be derived and stored, so that when matching of the preliminary right log in the non-matching state is performed afterward, a past settlement for the music can be retroactively applied.

According to one embodiment of the present invention, the preliminary right log may be in the non-matching state, which is a state where the usage log is not matched in the master DB and does not exist in the master DB, so that when the master DB is obtained afterward, the matching can be performed.

According to one embodiment of the present invention, one or more notations for a specific artist may be prestored, so that it is possible to respond to an artist name for the specific artist that is variously notated in the streaming server.

According to one embodiment of the present invention, the right log may further include a release date and a release record label, so that a determination criterion may be further set by the service server in consideration of a company name, a title, and the release date under the Copyright Act.

BRIEF DESCRIPTION OF THE DRAWINGS

FIGS. 1A and 1B schematically show a configuration and steps for performing a method for matching a music usage log (cue sheet) and a copyright holder according to one embodiment of the present invention.

FIGS. 4A, 4B, and 4C schematically show a first right log matching step according to one embodiment of the present invention.

FIG. 6 schematically shows an extended right log derivation step according to one embodiment of the present invention.

FIGS. 7A and 7B schematically show a second matching step, a non-matching step, and a third matching step according to one embodiment of the present invention.

FIGS. 9A, 9B, 9C, and 9D schematically show a method for calculating each of matching rates according to one embodiment of the present invention.

FIG. 10 schematically shows a right log including a release date and a release record label according to one embodiment of the present invention.

DETAILED DESCRIPTION OF THE INVENTION

Figure 1A:
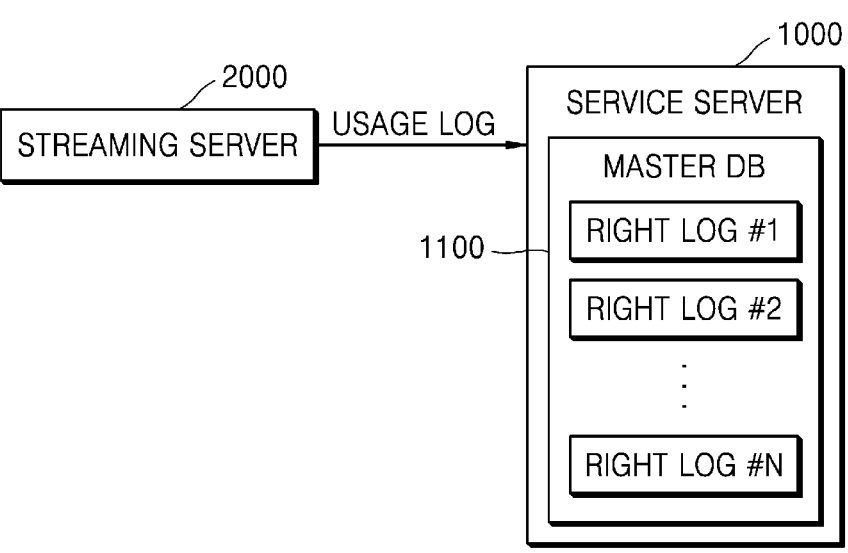

Hereinafter, various embodiments and/or aspects will be described with reference to the drawings. In the following description, numerous specific details are set forth in order to provide a thorough understanding of one or more aspects for the purpose of explanation. However, it will also be appreciated by a person having ordinary skill in the art that such aspect(s) may be carried out without the specific details. The following description and accompanying drawings will be set forth in detail for specific illustrative aspects among one or more aspects. However, the aspects are merely illustrative, some of various ways among principles of the various aspects may be employed, and the descriptions set forth herein are intended to include all the various aspects and equivalents thereof.

In addition, various aspects and features will be presented by a system that may include a plurality of devices, components and/or modules or the like. It will also be understood and appreciated that various systems may include additional devices, components and/or modules or the like, and/or may not include all the devices, components, modules or the like recited with reference to the drawings.

The term "embodiment", "example", "aspect", "exemplification", or the like as used herein may not be construed in that an aspect or design set forth herein is preferable or advantageous than other aspects or designs. The terms 'unit', 'component', 'module', 'system', 'interface' or the like used in the following generally refer to a computer-related entity, and may refer to, for example, hardware, software, or a combination of hardware and software.

In addition, the terms "include" and/or "comprise" specify the presence of the corresponding feature and/or component, but do not preclude the possibility of the presence or addition of one or more other features, components or combinations thereof.

In addition, the terms including an ordinal number such as first and second may be used to describe various components, however, the components are not limited by the terms. The terms are used only for the purpose of distinguishing one component from another component. For example, the first component may be referred to as the second component without departing from the scope of the present invention, and similarly, the second component may also be referred to as the first component. The term "and/or" includes any one of a plurality of related listed items or a combination thereof.

In addition, in embodiments of the present invention, unless defined otherwise, all teems used herein including technical or scientific terms have the same meaning as commonly understood by those having ordinary skill in the art. Terms such as those defined in generally used dictionaries will be interpreted to have the meaning consistent with the meaning in the context of the related art, and will not be interpreted as an ideal or excessively formal meaning unless expressly defined in the embodiment of the present invention.

FIGS. 1A and 1B schematically show a configuration and steps for performing a method for matching a music usage log (cue sheet) and a copyright holder according to one embodiment of the present invention.

As shown in FIGS. 1A and 1B, the present invention may provide a method for matching a music usage log (cue sheet) and a copyright holder, which is performed by a service server 1000, wherein the service server 1000 includes a master DB, the master DB stores a plurality of right logs identified by a music copyright holder of right music, each of the right logs includes a right music name, a right artist name, and a right album name of the right music, and a cumulative record value obtained by accumulating a record value, which is a number of usage times of the right music, on a monthly basis, the service server 1000 performs: a usage log reception step of receiving a usage log including a music name, an artist name, an album name, a usage date, and a record value for used music from a streaming server 2000; a preliminary right log derivation step of deriving a preliminary right log including a preliminary music name, a preliminary artist name, a preliminary album name, a usage month, and a record value, which are obtained by preprocessing the usage log according to a preset rule; a music name matching rate calculation step of calculating a music name matching rate between each of the right music names of the right logs and the preliminary music name; an artist name matching rate calculation step of calculating an artist name matching rate between a right artist name of a right log in which the music name matching rate has been calculated as 100% in the music name matching rate calculation step and the preliminary artist name; and a first right log matching step when a right log in which the artist name matching rate has been calculated as being greater than or equal to a preset reference artist name matching rate in the artist name matching rate calculation step exists, and the first right log matching step includes: a first preliminary matching right log derivation step of calculating an album name matching rate between each of the right album names of the right logs in which the artist name matching rate has been calculated as being greater than or equal to the preset reference artist name matching rate and the preliminary album name, and deriving a right log corresponding to the album name matching rate that is greater than or equal to a preset reference album name matching rate as a first preliminary matching right log; and a first matching step of deriving one of first preliminary matching right logs as a matching right log based on the artist name matching rate and the album name matching rate of each of the first preliminary matching right logs, and adding up the record value of the preliminary right log to the cumulative record value of the matching right log according to the usage month.

FIG. 1A corresponds to a view showing the configuration for performing the method for matching the music usage log (cue sheet) and the copyright holder.

The streaming server 2000 may include a server for providing streaming and downloading services for music, such as Melon, Bugs Music, Genie Music, Flo, Soribada, YouTube, and YouTube Music, and may include a monitoring server of a broadcasting company, which manages music transmitted from a TV program, a radio, and the like. In addition, the streaming server 2000 may include a server for providing music to a performance, a store, and the like.

The streaming server 2000 may generate a usage log for the music. The usage log may include all data on usage of the music, and may preferably include a music name, an artist name, an album name, a usage date, and a record value. The usage date may include year, month, and day, and the record value may represent the number of usage times of the music.

The streaming server 2000 may transmit the usage log to the service server 1000.

The service server 1000 may include a master DB for a right holder of music. The master DB may include a right log including the right holder of the music, in which the right log may be stored for each music in a one-to-one correspondence with each music. In other words, the master DB may include a plurality of right logs.

The service server 1000 may receive and store the usage log, and derive a preliminary right log obtained by preprocessing the usage log into data in the same format as the right log, in which the preliminary right log may be matched with the right log. In detail, the right log may include a cumulative record value obtained by accumulating the record value on a monthly basis, and the record value of the usage log may be added up to the cumulative record value of the right log.

In other words, the present invention provides a method for providing an accurate settlement for usage of the music to the right holder, in which the usage log received from the streaming server 2000 may be appropriately preprocessed so as to be matched with the right log that is prestored in the service server 1000, and the usage log may be matched with the right log, so that the number of usage times of the music may be accumulated.

According to one embodiment of the present invention, a preprocessing process of the usage log may perform derivation by compressing the usage log based on properties of the usage log under a condition that an original state of the usage log is not damaged or edited.

According to one embodiment of the present invention, the service server 1000 may derive the preliminary right log by preprocessing the usage log, so that the usage log may be matched with a right log for the right holder of the music by accurately defining characteristics and properties of the usage log and ensuring consistency.

According to one embodiment of the present invention, the usage log may be matched with the right log, so that an accurate settlement may be made for the right holder.

FIG. 1B corresponds to a view showing the steps of the method for matching the music usage log (cue sheet) and the copyright holder.

The method for matching the music usage log and the copyright holder may include a usage log reception step, a preliminary right log derivation step, a music name matching rate calculation step, an artist name matching rate calculation step, a first right log matching step, and a second matching step, and all of the steps described above may be performed by the service server 1000.

In detail, a step S100 may correspond to the usage log reception step, and the service server 1000 may receive the usage log from the streaming server 2000. Details of the usage log will be described below.

A step S110 may correspond to the preliminary right log derivation step, and the service server 1000 may preprocess the received usage log.

The preprocessing may be performed according to a preset rule, and may represent processing of data included in the usage log for performing steps that will be described below in the same format as data included in the right log in order to match the data included in the usage log for performing steps that will be described below with the data included in the right log.

The preprocessing may be performed in consideration of simplicity of data processing, traceability, and compatibility with the right log. In detail, considering the nature of the music, a rule for the preprocessing may be preset in consideration of various notations generated upon creating the usage log in the streaming server 2000, orthography, and the like.

A preliminary right log obtained by preprocessing the usage log may be derived, in which the preliminary right log may include a preliminary music name obtained by preprocessing the music name of the usage log, a preliminary artist name obtained by preprocessing the artist name of the usage log, a preliminary album name obtained by preprocessing the album name of the usage log, a usage month obtained by preprocessing the usage date of the usage log, and the record value that has not been preprocessed.

In a step S120, a music name matching rate between the preliminary music name of the preliminary right log and each of the right music names of the right logs stored in the master DB.

In a step S130, an artist name matching rate may be calculated only for a right log in which the music name matching rate has been calculated as 100% in the step S120. In other words, the artist name matching rate between each of the right artist names of the right logs in which the music name matching rate has been calculated as 100% and the preliminary artist name of the preliminary right log may be calculated.

In a step S140, it may be determined whether each of a plurality of artist name matching rates calculated in the step S130 is greater than or equal to a preset reference artist name matching rate.

When an artist name matching rate that is greater than or equal to the reference artist name matching rate exists among the calculated artist name matching rates, the first right log matching step may be performed, in which the first right log matching step may include a first preliminary matching right log derivation step and a first matching step.

When the artist name matching rate that is greater than or equal to the reference artist name matching rate does not exist among the calculated artist name matching rates, a second right log matching step may be performed, in which the second right log matching step may include a second preliminary matching right log derivation step, an extended right log derivation step, a second matching step, a matching rate comparison step, a non-matching step, and a third matching step.

Figures 2A, 2B:
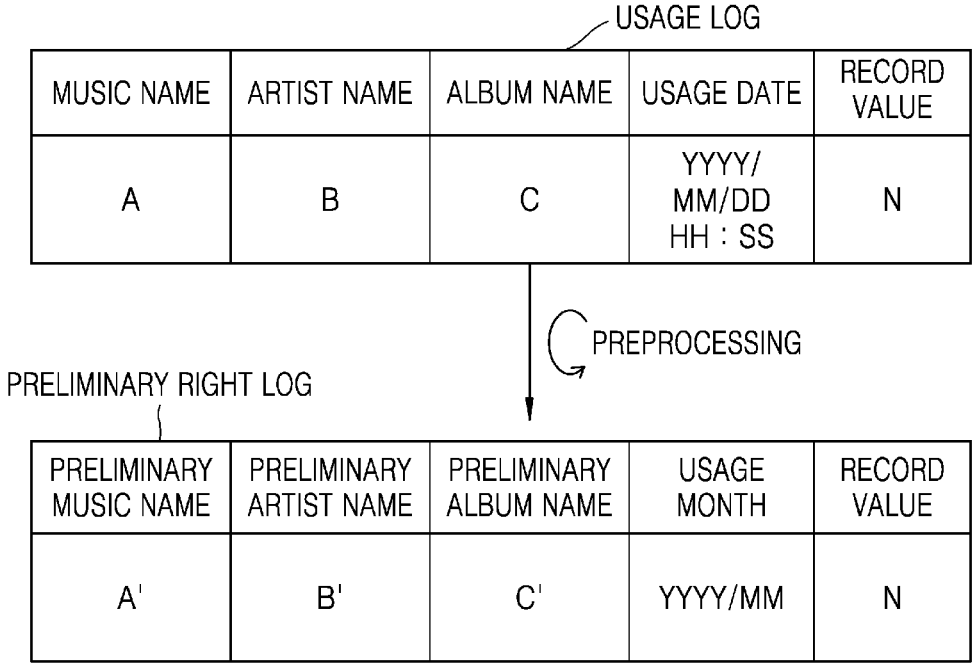
FIGS. 2A and 2B schematically shows a right log and a preliminary right log derivation step according to one embodiment of the present invention.

FIGS. 2A and 2B schematically show a right log and a preliminary right log derivation step according to one embodiment of the present invention.

FIG. 2A corresponds to a view showing the right log.

As shown in FIG. 2A, the service server 1000 may include the master DB, the master DB may store a plurality of right logs identified by a music copyright holder of right music, and each of the right logs may include a right music name, a right artist name, and a right album name of the right music, and a cumulative record value obtained by accumulating a record value, which is the number of usage times of the right music, on a monthly basis.

According to another embodiment of the present invention, the record value, which is the number of usage times of the music, may be stored in a separate settlement table. The settlement table may or may not be included in the master DB.

The right log may include a right music name, a right artist name, a right album name, a cumulative record value, and a usage date, and each of the right logs may be identified by the music copyright holder. In other words, a specific music copyright holder may have one or more right logs.

A right log table may be generated by the right logs.

According to another embodiment of the present invention, the right log may further include a track number in the right album including the right music, a right period, a share ratio, settlement information, and a universal content identifier (UCI) and an international standard recording code (ISRC) of the right music.

The UCI and the ISRC refer to domestic and international standard identification codes, which are information for allowing future code settlement, and the information may further improve accuracy and performance of the matching.

The right period may correspond to information on a start date and a termination date of the right, the share ratio may be displayed when a plurality of music copyright holders share a right to music of one right log, and the right period and the share ratio may be applied to the settlement.

The settlement information may correspond to a date in which the settlement has been performed and a series of information.

FIG. 2B corresponds to a view showing the preliminary right log derivation step.

As shown in FIG. 2B, the preliminary right log derivation step may derive a preliminary right log including a preliminary music name, a preliminary artist name, a preliminary album name, a usage month, and a record value, which are obtained by preprocessing the usage log according to a preset rule.

The usage log may correspond to usage data of the music, such as playback, downloading, and transmission in the streaming server 2000.

A usage log for specific music may be generated to vary in each streaming server 2000. For example, even in a case of the same music, notations of music names, artist names, and album names may be different from each other in a specific streaming server 2000 and another streaming server 2000, and record values may vary depending on the number of usage times of the music in each of the streaming servers 2000. Therefore, according to the present invention, the usage log may be standardized and matched with the right log.

The usage log may include a music name of the music, an artist name of the music, an album name of the music, a usage date of the music, and a record value, which is the number of usage times of the music.

The usage date may include year, month, and day, and the record value may be generated based on the usage date. Therefore, a total number of usage times the music has been used on a date corresponding to the year, month, and day may correspond to the record value.

In the preliminary right log derivation step, the service server 1000 may derive the preliminary right log obtained by receiving and preprocessing the usage log. The preliminary right log may include the preliminary music name, the preliminary artist name, the preliminary album name, and the usage month.

The preliminary music name may be derived by preprocessing the music name, the preliminary artist name may be derived by preprocessing the artist name, the preliminary album name may be derived by preprocessing the album name, and the usage month may be derived by preprocessing the usage date.

The preprocessing of the music name, the artist name, and the album name may correspond to an operation of removing a special character other than a text, such as a space, '( )', '[ ]', a tab, and a line-break, and removing a definite article 'the' when the definite article 'the' is located at the beginning.

Figure 3:
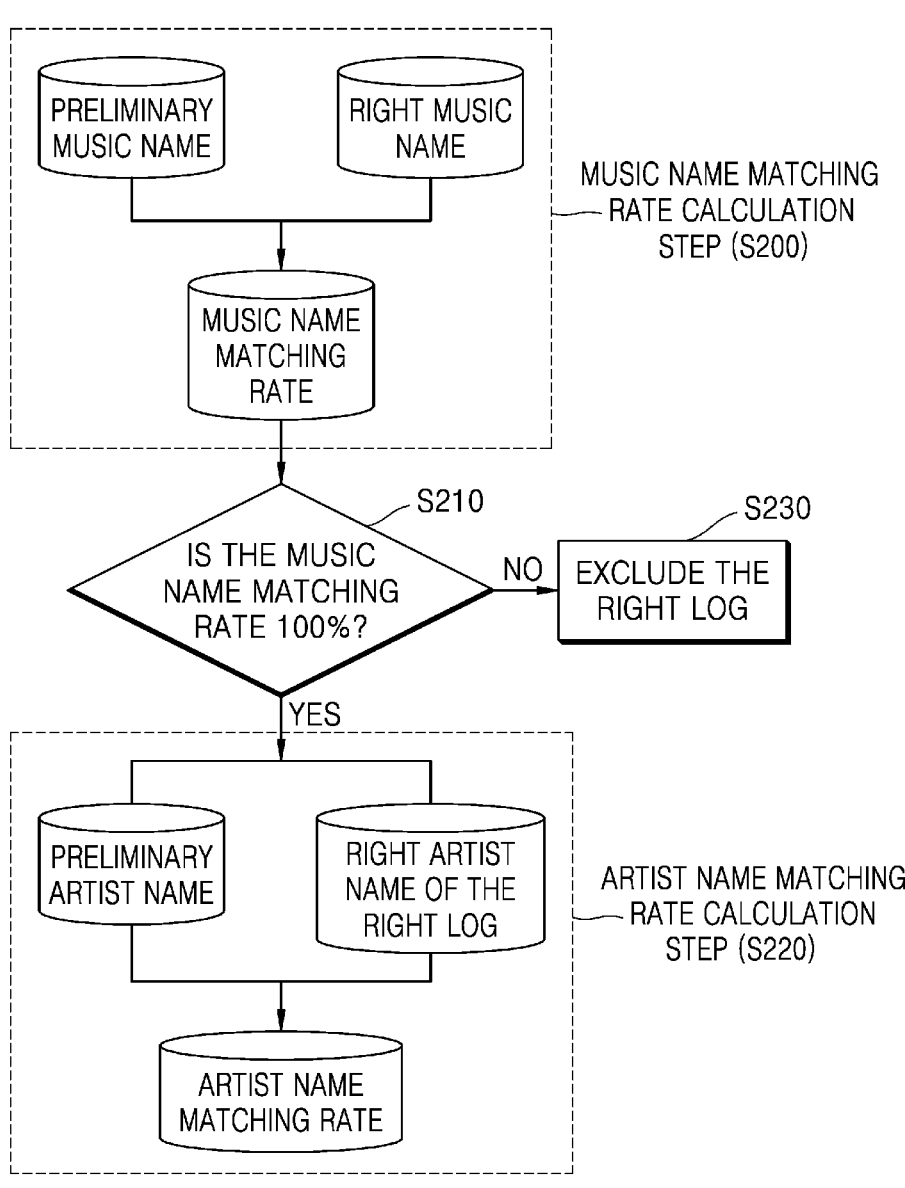
FIG. 3 schematically shows a music name matching rate calculation step and an artist name matching rate calculation step according to one embodiment of the present invention.

FIG. 3 schematically shows a music name matching rate calculation step and an artist name matching rate calculation step according to one embodiment of the present invention.

As shown in FIG. 3, the music name matching rate calculation step may calculate a music name matching rate between each of the right music names of the right logs and the preliminary music name, and the artist name matching rate calculation step may calculate an artist name matching rate calculation step of calculating an artist name matching rate between a right artist name of a right log in which the music name matching rate has been calculated as 100% in the music name matching rate calculation step and the preliminary artist name.

A step S200 may correspond to the music name matching rate calculation step, and may calculate the music name matching rate based on the preliminary music name of the preliminary right log and the right music name of the right log. In other words, the music name matching rate may be calculated based on a character string of the preliminary music name and a character string of the right music name. The right music name of the right log may correspond to all the right music name of the right logs stored in the master DB.

According to one embodiment of the present invention, the character string of the preliminary music name may be preprocessed according to a format of the right music name, so that a matching rate may be calculated more accurately.

According to one embodiment of the present invention, although various algorithms capable of retrieving a character string may be applied to calculate the music name matching rate, preferably, a string searching algorithm, which is a method for retrieving a specific character or character string from a larger character string or text, may be applied.

A step S210 may correspond to a determination step for the music name matching rate. According to the step S200, the music name matching rate with the preliminary music name may be calculated for each of the right music names of the right logs, and a next step S220 may be performed only for each of the right logs in which the music name matching rate is 100%. In other words, when the music name matching rate is not 100%, a step S230 of excluding the right log may be performed.

The step S220 may correspond to the artist name matching rate calculation step, and calculate the artist name matching rate based on the preliminary artist name of the preliminary right log and the right artist name of the right log. In other words, the artist name matching rate may be calculated based on a character string of the preliminary artist name and a character string of the right artist name. The right log in the step S220 of FIG. 3 may represent the right log in which the music name matching rate is 100%.

According to one embodiment of the present invention, the character string of the preliminary artist name may be preprocessed according to a format of the right artist name, so that a matching rate may be calculated more accurately.

According to one embodiment of the present invention, although various algorithms capable of retrieving a character string may be applied to calculate the artist name matching rate, preferably, a string searching algorithm, which is a method for retrieving a specific character or character string from a larger character string or text, may be applied.

Figure 4A:
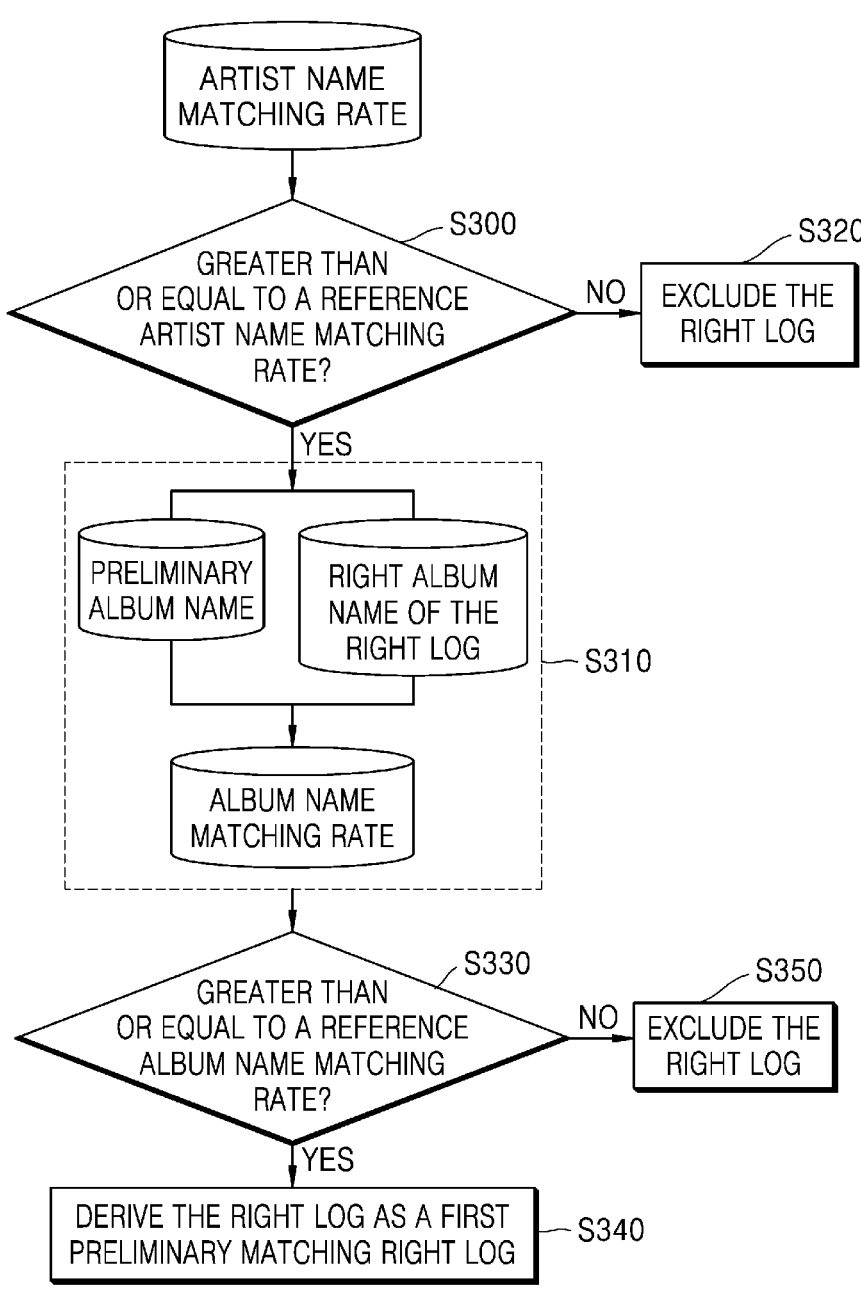
Figures 4B, 4C:
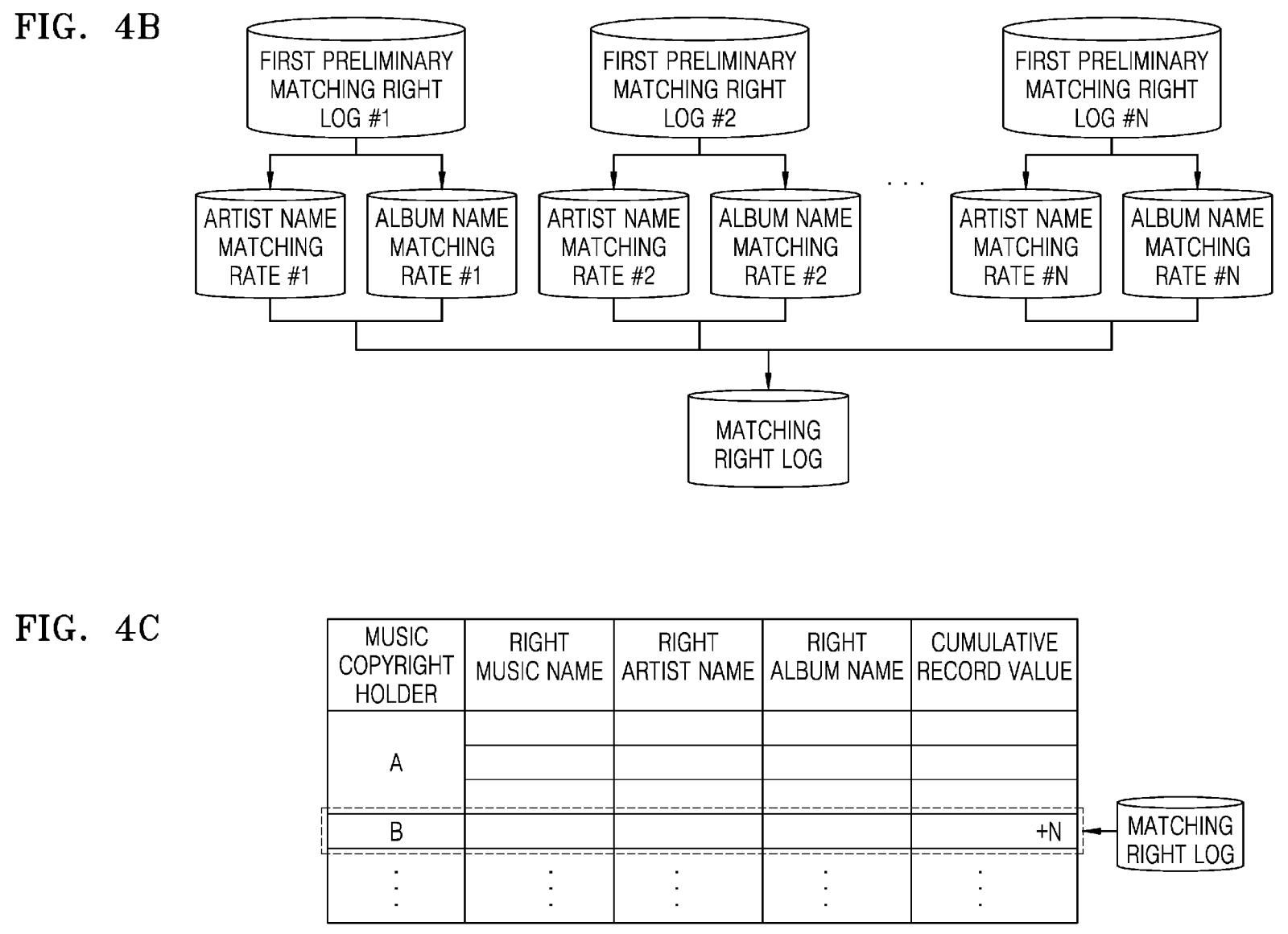

FIGS. 4A, 4B and 4C schematically shows a first right log matching step according to one embodiment of the present invention.

As shown in FIGS. 4A, 4B, and 4C, the first right log matching step when a right log in which the artist name matching rate has been calculated as being greater than or equal to the preset reference artist name matching rate in the artist name matching rate calculation step exists may be performed, and the first right log matching step may include: a first preliminary matching right log derivation step of calculating an album name matching rate between each of the right album names of the right logs in which the artist name matching rate has been calculated as being greater than or equal to the preset reference artist name matching rate and the preliminary album name, and deriving a right log corresponding to the album name matching rate that is greater than or equal to a preset reference album name matching rate as a first preliminary matching right log; and a first matching step of deriving one of first preliminary matching right logs as a matching right log based on the artist name matching rate and the album name matching rate of each of the first preliminary matching right logs, and adding up the record value of the preliminary right log to the cumulative record value of the matching right log according to the usage month.

FIG. 4A corresponds to a view showing the first preliminary matching right log derivation step.

A step S300 may correspond to a determination step for the artist name matching rate. According to the step S220 of FIG. 3, the artist name matching rate with the preliminary artist name may be calculated for each of the right artist names of the right logs, and a next step S310 may be performed only for each of the right logs in which the artist name matching rate is greater than or equal to the preset reference artist name matching rate. In other words, when the artist name matching rate is not greater than or equal to the reference artist name matching rate, a step S320 of excluding the right log may be performed.

Steps S310, S330, and S340 may correspond to detailed steps of the first preliminary matching right log derivation step. The step S310 may calculate the album name matching rate based on the preliminary album name of the preliminary right log and the right album name of the right log. In other words, the album name matching rate may be calculated based on a character string of the preliminary album name and a character string of the right album name. The right log in the step S310 of FIG. 4A may represent the right log in which the artist name matching rate is greater than or equal to the reference artist name matching rate.

According to one embodiment of the present invention, the character string of the preliminary album name may be preprocessed according to a format of the right album name, so that a matching rate may be calculated more accurately.

According to one embodiment of the present invention, although various algorithms capable of retrieving a character string may be applied to calculate the album name matching rate, preferably, a string searching algorithm, which is a method for retrieving a specific character or character string from a larger character string or text, may be applied.

The step S330 may correspond to a determination step for the album name matching rate. According to the step S310, the album name matching rate with the preliminary album name may be calculated for each of the right album names of the right logs, and a next step S340 may be performed only for each of the right logs in which the album name matching rate is greater than or equal to the preset reference album name matching rate. In other words, when the album name matching rate is not greater than or equal to the reference album name matching rate, a step S350 of excluding the right log may be performed.

In the step S340, the right log when the album name matching rate is not greater than or equal to the reference album name matching rate may be derived as the first preliminary matching right log.

FIG. 4B corresponds to a view showing the derivation of the matching right log in the first matching step.

In the first matching step, one matching right log may be derived from a plurality of first preliminary matching right logs.

In detail, the first preliminary matching right log may correspond to some of the right logs stored in the master DB, and one or more first preliminary matching right logs may be provided.

The music name matching rate between the right music name of the first preliminary matching right log and the preliminary music name may be 100%, the artist name matching rate between the right artist name of the first preliminary matching right log and the preliminary artist name may be greater than or equal to the reference artist name matching rate, and the album name matching rate between the right album name of the first preliminary matching right log and the preliminary album name may be greater than or equal to the reference album name matching rate.

The artist name matching rate and the album name matching rate for each of the first preliminary matching right logs may be calculated.

For example, in FIG. 4B, an artist name matching rate #1 and an album name matching rate #1 have been calculated for a first preliminary matching right log #1, an artist name matching rate #2 and an album name matching rate #2 have been calculated for a first preliminary matching right log #2, and an artist name matching rate #N and an album name matching rate #N have been calculated for a first preliminary matching right log #N.

In the first matching step, the matching right log may be derived based on the artist name matching rate and the album name matching rate of each of the first preliminary matching right logs.

According to one embodiment of the present invention, a first preliminary matching right log corresponding to a highest value according to a value obtained by adding up the artist name matching rate and the album name matching rate may be derived as the matching right log.

According to another embodiment of the present invention, a first preliminary matching right log corresponding to a highest value according to a value obtained by adding up a weighted value of the artist name matching rate and the album name matching rate may be derived as the matching right log.

According to another embodiment of the present invention, a first preliminary matching right log corresponding to a highest value according to a value obtained by adding up a weighted value to the album name matching rate and the artist name matching rate may be derived as the matching right log.

FIG. 4C corresponds to a view showing the adding-up of the record value in the first matching step.

In the first matching step, the record value of the preliminary right log may be added up to the cumulative record value of the matching right log.

In detail, the matching right log may be one of the right logs included in the master DB. The matching right log may include a right music name, a right artist name, a right album name, and a cumulative record value, and the cumulative record value may correspond to a value obtained by adding up the record value of the preliminary right log on a monthly basis.

For example, there may be a cumulative record value corresponding to January, and the cumulative record value corresponding to January may correspond to a value obtained by adding up all record values of the preliminary right log corresponding to January and received from the streaming servers 2000, respectively.

In FIG. 4C, the matching right log may correspond to a right log identified by a music copyright holder, and N, which is the record value of the preliminary right log, has been added up to the cumulative record value of the right log.

According to one embodiment of the present invention, the record value of the preliminary right log may be added up on a monthly basis, so that domestic and overseas settlement processes may respond to music income settlement in a monthly or quarterly process.

According to another embodiment of the present invention, the adding-up may also be performed on a daily basis to perform settlement. In other words, the record value may be calculated and added up on a daily basis, and data obtained by the adding-up on a daily basis may be used as detailed statistical data.

Figure 5:
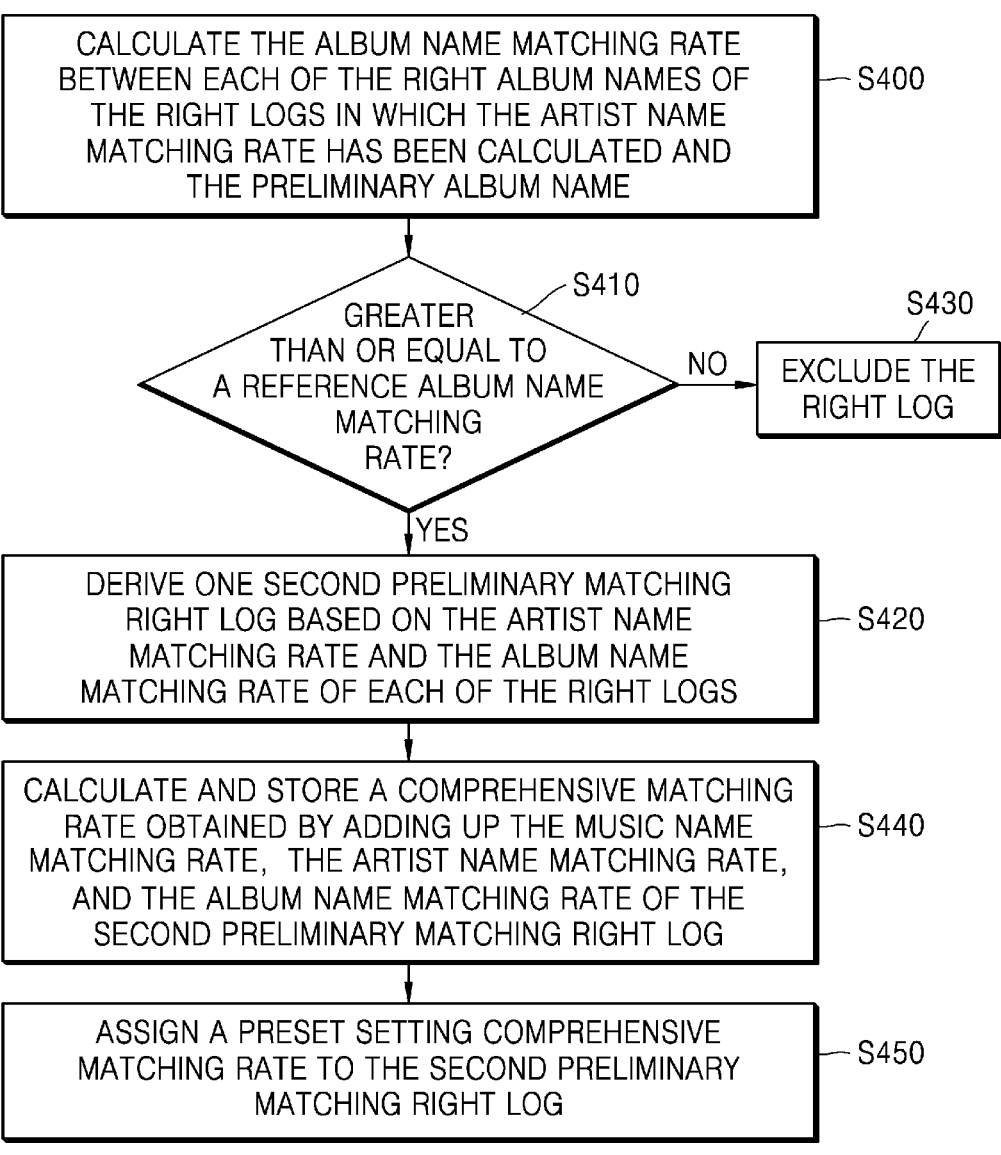
FIG. 5 schematically shows a second preliminary matching right log derivation step according to one embodiment of the present invention.

FIGS. 5 to 7 are views corresponding to the second right log matching step.

Regarding the second right log matching step, the service server may perform a second right log matching step when a right log in which the artist name matching rate has been calculated as being greater than or equal to the preset reference artist name matching rate in the artist name matching rate calculation step does not exist, and the second right log matching step may include: a second preliminary matching right log derivation step of calculating the album name matching rate between each of the right album names of the right logs in which the artist name matching rate has been calculated and the preliminary album name, deriving one second preliminary matching right log based on the artist name matching rate and the album name matching rate of each of the right logs corresponding to the album name matching rate that is greater than or equal to a preset reference album name matching rate, calculating and storing a comprehensive matching rate obtained by adding up the music name matching rate, the artist name matching rate, and the album name matching rate of the second preliminary matching right log, and assigning a preset setting comprehensive matching rate to the second preliminary matching right log; an extended right log derivation step of deriving one or more extended right logs by performing extended derivation on the right logs based on the preliminary right log and the preset rule, and calculating an extended comprehensive matching rate obtained by deriving and adding up the music name matching rate, the artist name matching rate, and the album name matching rate of the extended right log and the preliminary right log; a second matching step of deriving, when the setting comprehensive matching rate is less than the extended comprehensive matching rate, an extended right log corresponding to a largest value among the extended comprehensive matching rates as the matching right log, and adding up the record value of the preliminary right log to the cumulative record value of the matching right log according to the usage month; a matching rate comparison step of comparing and determining, when the setting comprehensive matching rate is greater than the extended comprehensive matching rate, the setting comprehensive matching rate and the comprehensive matching rate; a non-matching step of storing, when the setting comprehensive matching rate is greater than the comprehensive matching rate in the matching rate comparison step, the preliminary right log in the master DB as non-matching; and a third matching step of deriving, when the setting comprehensive matching rate is less than the comprehensive matching rate in the matching rate comparison step, the second preliminary matching right log as the matching right log, and adding up the record value of the preliminary right log to the cumulative record value of the matching right log according to the usage month.

FIG. 5 schematically shows a second preliminary matching right log derivation step according to one embodiment of the present invention.

As shown in FIG. 5, the second preliminary matching right log derivation step may calculate the album name matching rate between each of the right album names of the right logs in which the artist name matching rate has been calculated and the preliminary album name, derive one second preliminary matching right log based on the artist name matching rate and the album name matching rate of each of the right logs corresponding to the album name matching rate that is greater than or equal to a preset reference album name matching rate, calculate and store a comprehensive matching rate obtained by adding up the music name matching rate, the artist name matching rate, and the album name matching rate of the second preliminary matching right log, and assign a preset setting comprehensive matching rate to the second preliminary matching right log.

The second preliminary matching right log derivation step may be included in the second right log matching step.

Since the second right log matching step is performed when the right log in which the artist name matching rate has been calculated as being greater than or equal to the preset reference artist name matching rate in the artist name matching rate calculation step does not exist, the second preliminary matching right log derivation step may be performed on the right log in which the artist name matching rate has been calculated.

In other words, the right log in which the artist name matching rate has been calculated may correspond to the right log in which the music name matching rate has been calculated as 100% in the music name matching rate calculation step.

In a step S400, the album name matching rate may be calculated based on the right album name of the right log in which the artist name matching rate has been calculated and the preliminary album name. In other words, the album name matching rate may be calculated based on the character string of the right album name and the character string of the preliminary album name.

According to one embodiment of the present invention, although various algorithms capable of retrieving a character string may be applied to calculate the album name matching rate, preferably, a string searching algorithm, which is a method for retrieving a specific character or character string from a larger character string or text, may be applied.

A step S410 may correspond to a determination step for the album name matching rate. According to the step S400 of FIG. 5, the album name matching rate with the preliminary album name may be calculated for each of the right album names of the right logs, and a next step S420 may be performed only for each of the right logs in which the album name matching rate is greater than or equal to the preset reference album name matching rate. In other words, when the album name matching rate is not greater than or equal to the reference album name matching rate, a step S430 of excluding the right log may be performed.

In the step S420, one second preliminary matching right log may be derived based on the artist name matching rate and the album name matching rate of each of the right logs corresponding to the album name matching rate that is greater than or equal to the preset reference album name matching rate.

According to one embodiment of the present invention, a right log corresponding to a highest value according to a value obtained by adding up the artist name matching rate and the album name matching rate may be derived as the second preliminary matching right log.

According to another embodiment of the present invention, a right log corresponding to a highest value according to a value obtained by adding up a weighted value of the artist name matching rate and the album name matching rate may be derived as the second preliminary matching right log.

According to another embodiment of the present invention, a right log corresponding to a highest value according to a value obtained by adding up a weighted value to the album name matching rate and the artist name matching rate may be derived as the second preliminary matching right log.

In a step S440, a comprehensive matching rate, which is a value obtained by adding up the music name matching rate, the artist name matching rate, and the album name matching rate of the second preliminary matching right log, may be calculated and stored. The comprehensive matching rate may be used in steps that will be described below.

In a step S450, the preset setting comprehensive matching rate may be assigned to the second preliminary matching right log. The preset setting comprehensive matching rate may be set by a manager.

In other words, two matching rates, which are the comprehensive matching rate and the setting comprehensive matching rate, may be used as a matching rate of the second preliminary matching right log.

FIG. 6 schematically shows an extended right log derivation step according to one embodiment of the present invention.

As shown in FIG. 6, the extended right log derivation step may derive one or more extended right logs by performing extended derivation on the right logs based on the preliminary right log and the preset rule, and calculate an extended comprehensive matching rate obtained by deriving and adding up the music name matching rate, the artist name matching rate, and the album name matching rate of the extended right log and the preliminary right log.

The extended right log derivation step may include steps S500 and S510, and in the step S500, when compared with the artist name matching rate calculation step and the first preliminary matching right log derivation step, the extended right log may be derived by performing the extended derivation on a calculation target (right log) corresponding to each of the steps.

The extended derivation may be based on a preset rule, one or more extended right logs may be derived, and the preset rule used to derive each of the one or more extended right logs may include one or more rules. The preset rule for the extended derivation will be described below.

In general, matching rates that are references for the artist name matching rate calculation step and the first preliminary matching right log derivation step (100% in a case of the music name matching rate, the reference artist name matching rate in a case of the artist name matching rate, and the reference album name matching rate in a case of the album name matching rate) may be lowered to calculate each of the matching rates for more right logs.

In a step S510, the extended comprehensive matching rate may be calculated by calculating and adding up the music name matching rate, the artist name matching rate, and the album name matching rate of each of the one or more extended right logs and the preliminary right log.

According to one embodiment of the present invention, the music name matching rate, the artist name matching rate, and the album name matching rate of each of the one or more extended right logs may be calculated in a process of performing the extended derivation in the step S500.

According to one embodiment of the present invention, the extended derivation may be performed on a right log that has not been a target in the previous steps, so that matching may be performed on a right log that has been omitted by an existing algorithm.

Figure 7A:
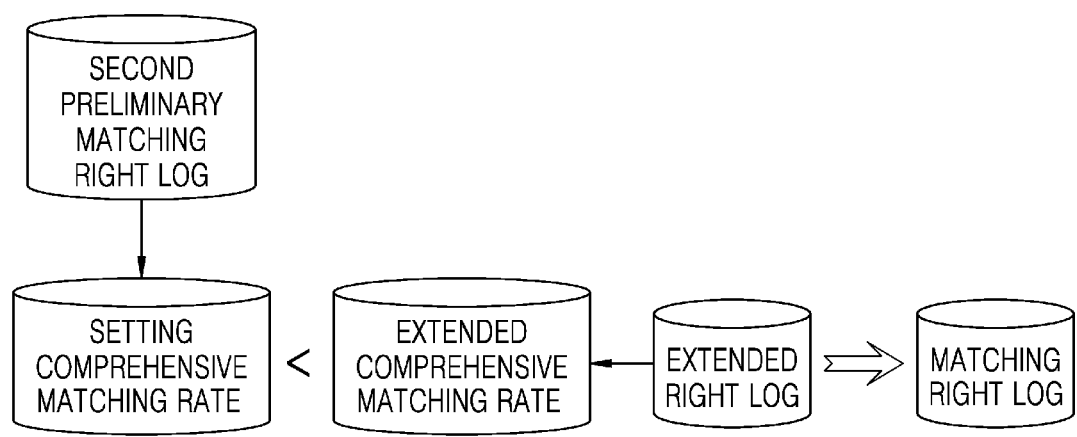
Figure 7B:
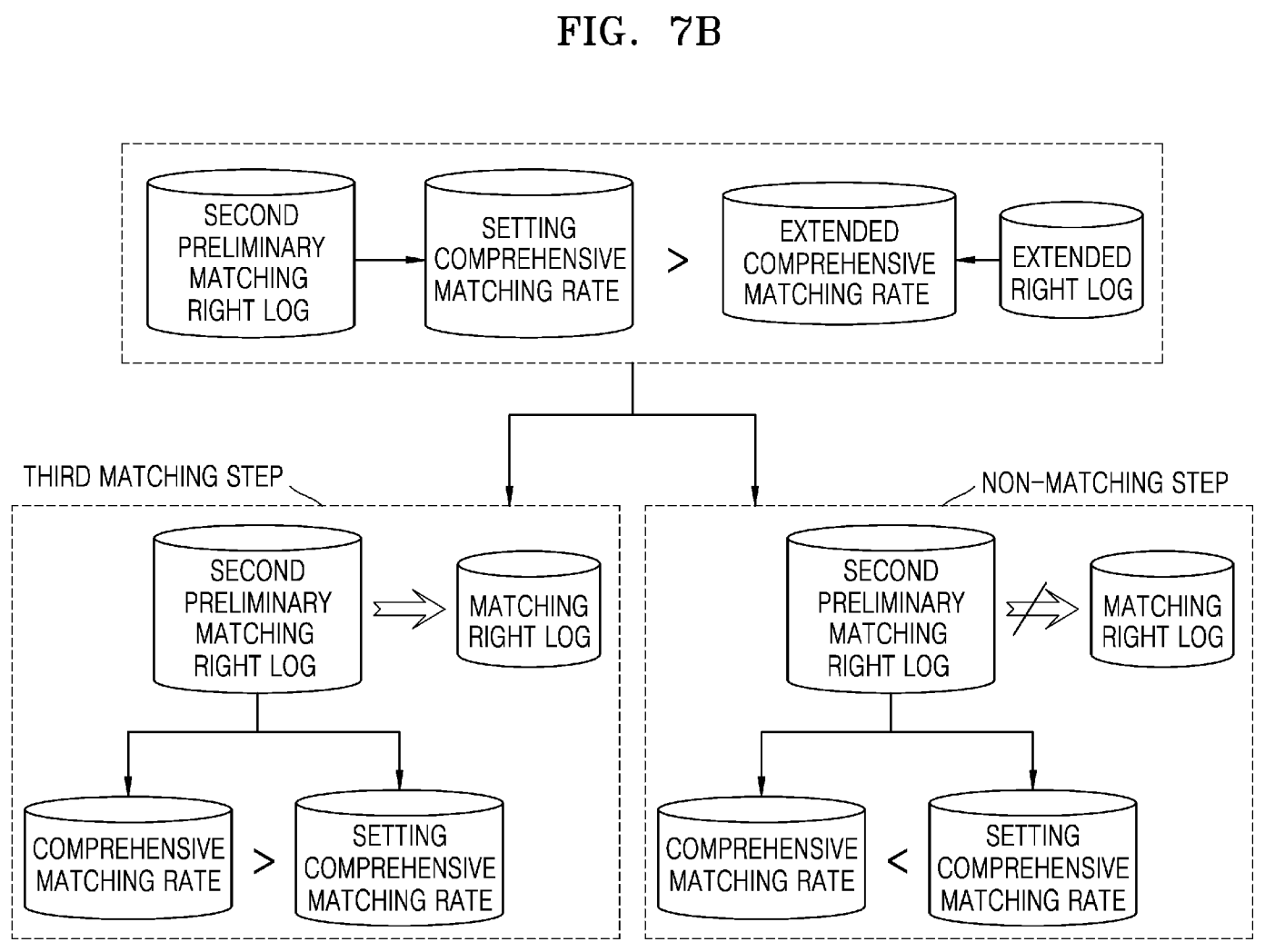

FIGS. 7A and 7B schematically show a second matching step, a non-matching step, and a third matching step according to one embodiment of the present invention.

FIG. 7A corresponds to a view showing the second matching step.

As shown in FIG. 7A, the second matching step may derive, when the setting comprehensive matching rate is less than the extended comprehensive matching rate, an extended right log corresponding to a largest value among the extended comprehensive matching rates as the matching right log, and add up the record value of the preliminary right log to the cumulative record value of the matching right log according to the usage month.

As described above, the second preliminary matching right log may be a right log that is the basis for matching one of the extended right logs derived by the extended derivation.

In order to match the extended right log with the second preliminary matching right log, an extended comprehensive matching rate corresponding to the largest value among the extended comprehensive matching rates of the one or more extended right logs may be compared with the setting comprehensive matching rate of the second preliminary matching right log.

The second matching step may be performed when the setting comprehensive matching rate is less than the extended comprehensive matching rate.

When the setting comprehensive matching rate is less than the extended comprehensive matching rate, the extended right log corresponding to the extended comprehensive matching rate corresponding to the largest value among the extended comprehensive matching rates of the one or more extended right logs may be derived as the matching right log.

In addition, in the second matching step, the record value of the preliminary right log may be added up to the cumulative record value of the matching right log according to the usage month. This has been shown in FIG. 4C.

FIG. 7B corresponds to a view showing the matching rate comparison step, the non-matching step, and the third matching step.

As shown in FIG. 7B, the matching rate comparison step may compare the setting comprehensive matching rate with the extended comprehensive matching rate corresponding to the largest value among the extended comprehensive matching rates of the one or more extended right logs to compare, when the setting comprehensive matching rate is greater than the extended comprehensive matching rate, the setting comprehensive matching rate and the comprehensive matching rate; the non-matching step may store, when the setting comprehensive matching rate is greater than the comprehensive matching rate in the matching rate comparison step, the second preliminary matching right log in the master DB as non-matching; and the third matching step may derive, when the setting comprehensive matching rate is less than the comprehensive matching rate in the matching rate comparison step, the second preliminary matching right log as the matching right log, and adding up the record value of the preliminary right log to the cumulative record value of the matching right log according to the usage month.

The matching rate comparison step, the non-matching step, and the third matching step may be performed when the setting comprehensive matching rate is greater than the extended comprehensive matching rate by comparing the setting comprehensive matching rate with the extended comprehensive matching rate corresponding to the largest value among the extended comprehensive matching rates of the one or more extended right logs.

In detail, in the matching rate comparison step, the comprehensive matching rate and the setting comprehensive matching rate of the second preliminary matching right log may be compared with each other.

The music name matching rate of the second preliminary matching right log may be 100%, the artist name matching rate may be less than the preset reference artist name matching rate, and the album name matching rate may be greater than or equal to the preset reference album name matching rate. A value obtained by adding up the music name matching rate of the second preliminary matching right log, the artist name matching rate of the second preliminary matching right log, and the album name matching rate of the second preliminary matching right log may correspond to the comprehensive matching rate.

The second preliminary matching right log may be a right log that is the basis for matching one of the one or more extended right logs derived by the extended derivation.

When the setting comprehensive matching rate is greater than the comprehensive matching rate in the matching rate comparison step, the non-matching step may be performed, and When the setting comprehensive matching rate is less than the comprehensive matching rate in the matching rate comparison step, the third matching step may be performed.

In the non-matching step, the second preliminary matching right log and the extended right log may not be derived as the matching right log.

Accordingly, the preliminary right log may be stored in the master DB as the non-matching. In other words, a non-matching state may correspond to a state where the usage log received from the streaming server 2000 does not match any of the right logs in the master DB.

Thereafter, the non-matched preliminary right log may be used in various ways such as matching by a person, storing as a new right log, and re-matching after storing in the non-matching state and obtaining of a new right log. A case where the new right log is obtained may correspond to registration of new right holders, registration of new music by existing right holders, resolution of disputed right music, and the like.

According to the present invention, the preliminary right log may be re-matched by applying a filtering algorithm for preprocessing and inspecting matching priorities (the artist, the album name, and a release label level) according to a preset rule.

According to one embodiment of the present invention, the preliminary right log in the non-matching state may be derived and stored, so that when the matching of the preliminary right log in the non-matching state is performed afterward, a past settlement for the music may be retroactively applied.

In the third matching step, the second preliminary matching right log may be derived as the matching right log.

In detail, as described above, the second preliminary matching right log may be a right log that is the basis for matching one of the one or more extended right logs derived by the extended derivation.

The music name matching rate of the second preliminary matching right log may be 100%, the artist name matching rate may be less than the preset reference artist name matching rate, and the album name matching rate may be greater than or equal to the preset reference album name matching rate. A value obtained by adding up the music name matching rate of the second preliminary matching right log, the artist name matching rate of the second preliminary matching right log, and the album name matching rate of the second preliminary matching right log may correspond to the comprehensive matching rate.

The third matching step may be performed when the comprehensive matching rate derived based on the second preliminary matching right log and the preliminary right log is greater than the preset setting comprehensive matching rate assigned to the second preliminary matching right log, and in the third matching step, the second preliminary matching right log may be derived as the matching right log.

In addition, in the third matching step, the record value of the preliminary right log may be added up to the cumulative record value of the matching right log according to the usage month. This has been shown in FIG. 4C.

The setting comprehensive matching rate may correspond to a preset value that allows the second preliminary matching right log to be more accurately derived as the matching right log according to an algorithm of the present invention.

Figure 8:
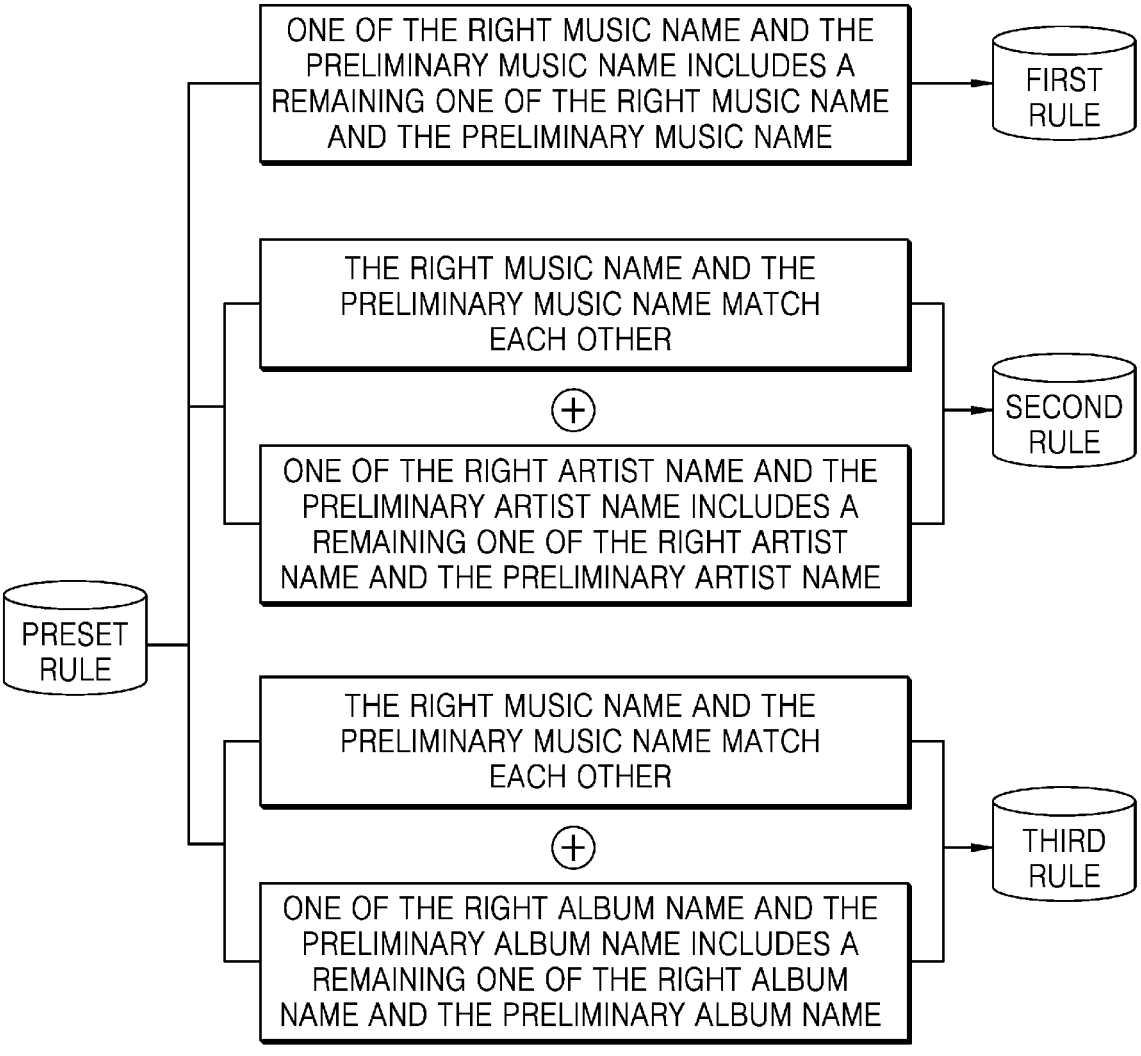
FIG. 8 schematically shows extended derivation according to one embodiment of the present invention.

FIG. 8 schematically shows extended derivation according to one embodiment of the present invention.

As shown in FIG. 8, the preset rule used to derive the extended right log may correspond to one or more of a first rule, a second rule, and a third rule, the first rule may correspond to a rule in which one of the right music name and the preliminary music name includes a remaining one of the right music name and the preliminary music name, the second rule may correspond to a rule in which the right music name and the preliminary music name match each other, and one of the right artist name and the preliminary artist name includes a remaining one of the right artist name and the preliminary artist name, and the third rule may correspond to a rule in which the right music name and the preliminary music name match each other, and one of the right album name and the preliminary album name includes a remaining one of the right album name and the preliminary album name.

The one or more extended right logs may be derived by performing the extended derivation to which the preset rule is applied on the right logs included in the master DB.

The extended derivation may represent an operation of filtering a right log in which the artist name matching rate and the album name matching rate have not been calculated in the artist name matching rate calculation step or the first right log matching step according to the preset rule so as to calculate the artist name matching rate and the album name matching rate.

For example, although the right log for calculating the artist name matching rate in the artist name matching rate calculation step corresponds to the right log in which the music name matching rate has been calculated as 100% in the music name matching rate calculation step, when the extended derivation is performed, the artist name matching rate may be calculated even in a case where the music name matching rate is not 100%.

Preset rules used to perform the extended derivation on the one or more extended right logs may be different from each other. The preset rule may include one or more rules.

In addition, one or more rules may be applied when the extended derivation is performed on an extended right log.

In detail, the first rule may correspond to a rule in which one of the right music name and the preliminary music name includes a remaining one of the right music name and the preliminary music name.

An example that will be described below corresponds to a case where the preliminary music name is included in the right music name.

A case where the music name matching rate calculated in the music name matching rate calculation step is 100% may correspond to a case where the character string of the right artist name of the right log and the character string of the preliminary artist name of the preliminary right log completely match each other.

When the first rule, which is a rule in which the preliminary music name is included in the right music names of the right logs, is applied, the music name matching rate may be less than or equal to 100%, so that the artist name matching rate may be calculated for a greater number of right logs than the number of the right logs in which the music name matching rate has been 100% in the music name matching rate calculation step.

For example, when the preliminary music name is 'Yesterday', the right music name of the right log corresponding to the music name matching rate calculation step may correspond to 'Yesterday'. However, in a case of a music name when performing the extended derivation, the right music name may include a character string of 'Yesterday' such as 'Yesterday Remastered 2009'. Therefore, the artist name matching rate and the album name matching rate may be calculated for a greater number of right logs.

According to one embodiment of the present invention, the one or more extended right logs may be calculated by applying the first rule to the right log in which the preliminary music name is included in the right music name and the preliminary right log, and performing extended matching, the music name matching rate, the artist name matching rate, and the album name matching rate may be calculated, and an extended right log corresponding to a highest value among values obtained by adding up the music name matching rate, the artist name matching rate, and the album name matching rate may be derived.

According to another embodiment of the present invention, the artist name matching rate and the album name matching rate may not be calculated for the extended right log derived by applying the first rule, and a preset setting artist name matching rate and a preset setting album name matching rate may be assigned instead of the artist name matching rate and the album name matching rate.

The second rule included in the preset rule may correspond to a rule in which the right music name and the preliminary music name match each other, and one of the right artist name and the preliminary artist name includes a remaining one of the right artist name and the preliminary artist name.

An example that will be described below corresponds to a case where the preliminary music name matches a right music name among the right music names of the right logs, and the preliminary artist name is included among the right artist names of the right logs.

Although the above two conditions are applied simultaneously, for convenience of description, application of the conditions will be described step by step.

When the rule in which the preliminary music name matches a right music name among the right music names of the right logs is applied, the case where the music name matching rate is 100% may be derived.

Thereafter, right logs corresponding to the rule "the preliminary artist name is included among the right artist names" may be filtered from right logs corresponding to the rule "the preliminary music name matches a right music name among the right music names".

In this case, a greater number of right logs may be derived than the number of right logs in the first right log matching step (the artist name matching rate is calculated as being greater than or equal to the preset reference artist name matching rate) described above.

For example, in a case of the artist name subjected to the extended derivation, when the preliminary artist name is 'Beatles', the right artist name of the right log may include a character string of 'Beatles', such as 'Beatles' and 'Beatles & Paul McCartney'.

According to one embodiment of the present invention, the one or more extended right logs may be calculated by applying the second rule to the right log in which the preliminary music name is included in the right music name and the preliminary right log, and performing extended matching, the music name matching rate, the artist name matching rate, and the album name matching rate may be calculated, and an extended right log corresponding to a highest value among values obtained by adding up the music name matching rate, the artist name matching rate, and the album name matching rate may be derived.

According to another embodiment of the present invention, the album name matching rate may not be calculated for the extended right log derived by applying the second rule, and a preset setting album name matching rate may be assigned instead of the album name matching rate.

The third rule included in the preset rule may correspond to a rule in which the right music name and the preliminary music name match each other, and one of the right album name and the preliminary album name includes a remaining one of the right album name and the preliminary album name.

An example that will be described below corresponds to a case where the preliminary music name matches a right music name among the right music names of the right logs, and the preliminary album name is included among the right album names of the right logs.

Although the above two conditions are applied simultaneously, for convenience of description, application of the conditions will be described step by step.

When the rule in which the preliminary music name matches a right music name among the right music names of the right logs is applied, the case where the music name matching rate is 100% may be derived.

Thereafter, right logs corresponding to the rule "the preliminary album name is included among the right album names" may be filtered from right logs corresponding to the rule "the preliminary music name matches a right music name among the right music names".

In this case, since the artist name is not taken into consideration, a greater number of right logs may be derived than the number of right logs in the first right log matching step (the artist name matching rate is calculated as being greater than or equal to the preset reference artist name matching rate) described above.

In addition, since the preliminary album name is included among the right album names, a greater number of right logs may be derived than the number of right logs in which the album name matching rate has been calculated as being greater than or equal to the preset reference album name matching rate.

For example, in a case of the album name subjected to the extended derivation, when the preliminary album name is 'Help!', the right album name of the right log may include a character string of 'Help!', such as 'Help!' and 'Help! Remastered'.

According to one embodiment of the present invention, the one or more extended right logs may be calculated by applying the third rule to the right log in which the preliminary music name is included in the right music name and the preliminary right log, and performing extended matching, the music name matching rate, the artist name matching rate, and the album name matching rate may be calculated, and an extended right log corresponding to a highest value among values obtained by adding up the music name matching rate, the artist name matching rate, and the album name matching rate may be derived.

According to another embodiment of the present invention, the artist name matching rate may not be calculated for the extended right log derived by applying the third rule, and a preset setting artist name matching rate may be assigned instead of the artist name matching rate.

FIGS. 9A, 9B, 9C, and 9D schematically show a method for calculating each of matching rates according to one embodiment of the present invention.

As shown in FIGS. 9A, 9B, 9C, and 9D, the music name matching rate may be a value obtained by calculating a matching percentage for a short character string based on a long character string when lengths of character strings of the right music name and the preliminary music name are compared with each other, in which when the preliminary music name includes additional information, the calculation is performed by using the preliminary music name with or without the additional information; the artist name matching rate may be a value obtained by calculating a matching percentage for a short character string based on a long character string when lengths of character strings of the right artist name and the preliminary artist name are compared with each other, in which when the preliminary artist name is Various Artist, a preset matching rate is assigned, the right artist name corresponds to one of a plurality of prestored notations for a right artist, and when the preliminary artist name includes additional information, the calculation is performed by using the preliminary artist name with or without the additional information; and the album name matching rate may be a value obtained by calculating a matching percentage of a short character string based on a long character string when lengths of character strings of the right album name and the preliminary album name are compared with each other.

FIG. 9A corresponds to a view showing a method for calculating a matching rate according to a character string.

According to the present invention, the music name matching rate, the artist name matching rate, and the album name matching rate may be calculated based on the character strings of the right music name, the right artist name, and the right album name, and based on the preliminary music name, the preliminary artist name, and the preliminary album name. Although the character strings (the music name, the artist name, and the album name) used to calculate the matching rates are different from each other, since the matching rates are calculated in the same way, a method for calculating the music name matching rate will be described below as an example.

In order to calculate the music name matching rate, the number of characters in the character string of the right music name and the number of characters in the character string of the preliminary music name may be compared with each other. The matching rate may be calculated based on a long character string among the character string of the right music name and the character string of the preliminary music name.

In detail, when the short character string and the long character string are compared with each other, the matching rate may be calculated by calculating a percentage for a fraction in which the number of the same characters in the character strings is defined as a numerator, and the number of characters in the long character string is defined as a denominator. When the character strings are compared with each other, an order in which the characters in the character strings are arranged may also be considered.

In FIG. 9A, the number of characters in the character string of the right log (one of the right music name, the right artist name, and the right album name) is 6, and the number of characters in the character string of the preliminary right log (one of the preliminary music name, the preliminary artist name, and the preliminary album name) is 3, so that the character string of the right log may be compared with the character string of the preliminary right log based on the character string of the right log. In other words, the number of the characters in the character string of the preliminary right log matched with the characters in the character string of the right log may be calculated.

Since the character string of the right log in FIG. 9A corresponds to 'abccde', and the character string of the preliminary right log corresponds to 'abd', a first character 'a' in the character string of the right log and a first character 'a' in the character string of the preliminary right log may be matched with each other since the first characters match when compared with each other, a second character 'b' in the character string of the right log and a second character 'b' in the character string of the preliminary right log may be matched with each other since the second characters match when compared with each other, and a third character 'c' in the character string of the right log and a third character 'd' in the character string of the preliminary right log may not be matched with each other since the third characters do not match when compared with each other.

The remaining fourth, fifth, and sixth characters of the right log may not be matched since fourth, fifth, and sixth characters do not exist in the character string of the preliminary right log.

Therefore, when calculating the matching rate, the numerator may correspond to 2, which is the number of characters matching between the character string of the right log and the character string of the preliminary right log, the denominator may correspond to 6, which is the number of characters in the character string of the right log (a longer string) that is the basis among the character string of the right log and the character string of the preliminary right log, and the fraction may be multiplied by 100 to obtain the percentage.

FIG. 9B corresponds to a view showing additional information.

The preliminary music name may include additional information except for the music name of the music, such as version information, remix information, and featuring information. The additional information may be juxtaposed with the music name of the music in parentheses.

In addition, the preliminary artist name may include additional information except for the artist name of the music, such as featuring information. The additional information may be juxtaposed with the artist name of the music in parentheses.

Although the example in the drawing is an example of the additional information of the preliminary music name, a method that will be described below may be applied to the additional information of the preliminary artist name to calculate the artist name matching rate.

In FIG. 9B, the preliminary music name received from the streaming server 2000 corresponds to 'You & Me (Flume Remix)', and 'You & Me (Flume Remix)' may include additional information. The 'You & Me (Flume Remix)' may be configured such that the music name of the music corresponds to 'You & Me', and the additional information is 'Flume Remix', which is remix information.

Therefore, the music name matching rate with the right music name may be calculated by deriving the preliminary music name as 'You & Me' or 'You & Me Flume Remix', which is obtained by excluding parentheses.

FIG. 9C corresponds to a view showing Various Artists.

When the preliminary artist name is Various Artists, a preset matching rate may be assigned as the artist name matching rate without calculating a matching rate with the right artist name.

According to one embodiment of the present invention, the preset matching rate may be assigned as the artist name matching rate for Various Artists.

FIG. 9D corresponds to a view showing a plurality of prestored notations.

A specific artist may have notations according to various activity names depending on various activities such as group activities, solo activities, and unit activities. Therefore, one or more notations of a right artist name of the specific artist may be prestored in the master DB.

In the example of FIG. 9D, notations corresponding to 'Girls Generation', 'Girls Generation', 'Taeyeon', 'Taeyeon', 'TaeTiSeo', and 'Oh! GG' may be prestored for an artist 'Taeyeon'.

According to one embodiment of the present invention, matching rates may be calculated between the preliminary artist name and all of the one or more prestored notations, a highest matching rate among the matching rates may be selected as the right artist name of the right log, and the matching rate may be derived as the artist name matching rate.

According to one embodiment of the present invention, the one or more notations for the specific artist may be prestored, so that it is possible to respond to an artist name for the specific artist that is variously notated in the streaming server.

FIG. 10 schematically shows a right log including a release date and a release record label according to one embodiment of the present invention.

The release date and the release record label may serve as the basis for determining the same value when the service server 1000 pertains the steps according to the present invention.

As shown in FIG. 10, the right log may further include a release date and a release record label, and when the number of matching right logs derived based on the artist name matching rate and the album name matching rate of each of the first preliminary matching right logs is not one in the first right log matching step, one matching right log may be calculated by further considering the release date and the release record label.

According to one embodiment of the present invention, in the first right log matching step, a highest value among values obtained by adding up the artist name matching rate and the album name matching rate may be derived as the matching right log, and when the number of first preliminary matching right logs corresponding to the highest value among the added-up values is greater than or equal to 2 instead of 1, the release date and the release record label may be further considered.

In detail, when the number of first preliminary matching right logs corresponding to the highest value among the added-up values is greater than or equal to 2, a first preliminary matching right log having an earlier release date may be derived as the matching right log.

When the number of first preliminary matching right logs corresponding to the highest value among the added-up values is greater than or equal to 2, and release dates are identical to each other, a first preliminary matching right log in which a release record label has a larger sales scale may be derived as the matching right log.

As shown in FIG. 10, the right log may further include the release date and the release record label, and when the number of right logs corresponding to a largest value among a second comprehensive matching rate, a third comprehensive matching rate, and a fourth comprehensive matching rate is greater than or equal to 2 in the second right log matching step, one matching right log may be calculated by further considering the release date and the release record label of the right logs corresponding to the largest value.

In detail, when the number of right logs corresponding to the largest value among the second comprehensive matching rate, the third comprehensive matching rate, and the fourth comprehensive matching rate is greater than or equal to 2, a right log having an earlier release date may be derived as the matching right log.

When the number of right logs corresponding to the largest value among the second comprehensive matching rate, the third comprehensive matching rate, and the fourth comprehensive matching rate is greater than or equal to 2, and release dates are identical to each other, a right log in which the release record label has a larger scale and greater awareness may be derived as the matching right log. In fact, the release record label including the right log has a preset level according to a scale and awareness.

According to one embodiment of the present invention, the right log may further include the release date and the release record label, so that a determination criterion for the same value may be set by the service server 1000.

Figure 11:
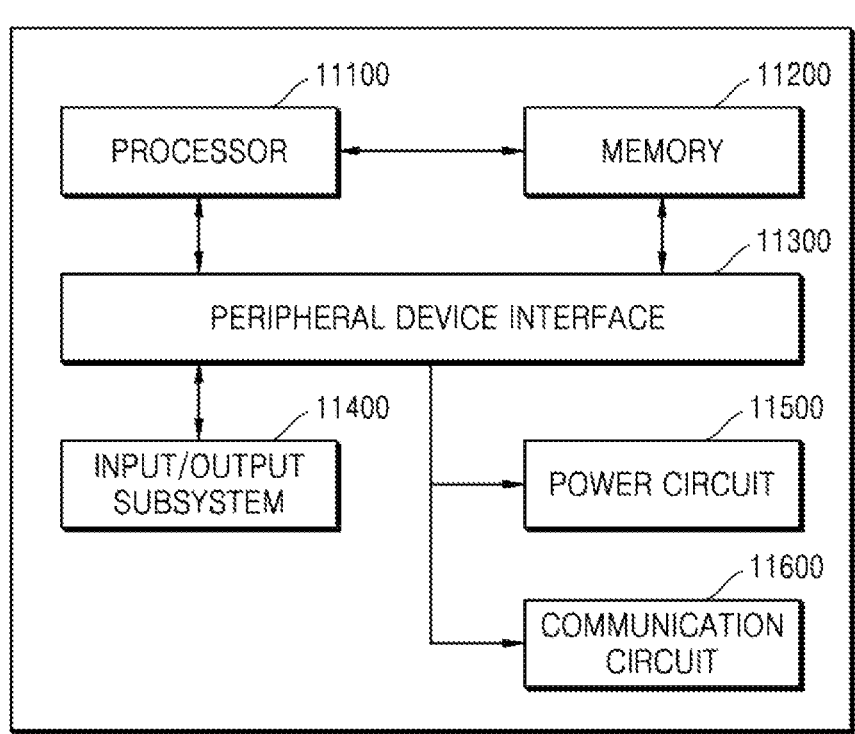
FIG. 11 schematically shows internal components of the computing device according to one embodiment of the present invention.

FIG. 11 schematically shows internal components of the computing device according to one embodiment of the present invention.

The service server 1000 shown in the above-described FIG. 1A may include components of the computing device 11000 shown in FIG. 11.

As shown in FIG. 11, the computing device 11000 may at least include at least one processor 11100, a memory 11200, a peripheral device interface 11300, an input/output subsystem (I/O subsystem) 11400, a power circuit 11500, and a communication circuit 11600. The computing device 11000 may correspond to the computing device 1000 shown in FIG. 1A.

The memory 11200 may include, for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 11000.

The access to the memory 11200 from other components of the processor 11100 or the peripheral interface 11300, may be controlled by the processor 11100.

The peripheral interface 11300 may combine an input and/or output peripheral device of the computing device 11000 to the processor 11100 and the memory 11200. The processor 11100 may execute the software module or the instruction set stored in memory 11200, thereby performing various functions for the computing device 11000 and processing data.

The input/output subsystem may combine various input/output peripheral devices to the peripheral interface 11300. For example, the input/output subsystem may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the I/O subsystem.

The power circuit 11500 may provide power to all or a portion of the components of the terminal. For example, the power circuit 11500 may include a power failure detection circuit, a power converter or inverter, a power status indicator, a power failure detection circuit, a power converter or inverter, a power status indicator, or any other components for generating, managing, and distributing the power.

The communication circuit 11600 may use at least one external port, thereby enabling communication with other computing devices.

Alternatively, as described above, if necessary, the communication circuit 11600 may transmit and receive an RF signal, also known as an electromagnetic signal, including RF circuitry, thereby enabling communication with other computing devices.

The above embodiment of FIG. 11 is merely an example of the computing device 11000, and the computing device 11000 may have a configuration or arrangement in which some components shown in FIG. 11 are omitted, additional components not shown in FIG. 11 are further provided, or at least two components are combined. For example, a computing device for a communication terminal in a mobile environment may further include a touch screen, a sensor or the like in addition to the components shown in FIG. 11, and the communication circuit 11600 may include a circuit for RF communication of various communication schemes (such as WiFi, 3G, LTE, Bluetooth, NFC, and Zigbee). The components that may be included in the computing device 11000 may be implemented by hardware, software, or a combination of both hardware and software which include at least one integrated circuit specialized in a signal processing or an application.

The methods according to the embodiments of the present invention may be implemented in the form of program instructions to be executed through various computing devices, thereby being recorded in a computer-readable medium. In particular, a program according to an embodiment of the present invention may be configured as a PC-based program or an application dedicated to a mobile terminal. The application to which the present invention is applied may be installed in the computing device 11000 through a file provided by a file distribution system. For example, a file distribution system may include a file transmission unit (not shown) that transmits the file according to the request of the computing device 11000.

The above-mentioned device may be implemented by hardware components, software components, and/or a combination of hardware components and software components. For example, the devices and components described in the embodiments may be implemented by using at least one general purpose computer or special purpose computer, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. For the further understanding, some cases may have described that one processing device is used, however, it is well known by those skilled in the art that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, and an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, computer storage medium or device, or in a signal wave to be transmitted. The software may be distributed over computing devices connected to networks, so as to be stored or executed in a distributed manner. The software and data may be stored in at least one computer-readable recording medium.

The method according to the embodiment may be implemented in the form of program instructions to be executed through various computing mechanisms, thereby being recorded in a computer-readable medium. The computer-readable medium may include program instructions, data files, data structures, and the like, independently or in combination thereof. The program instructions recorded on the medium may be specially designed and configured for the embodiment, or may be known to those skilled in the art of computer software so as to be used. An example of the computer-readable medium includes a magnetic medium such as a hard disk, a floppy disk and a magnetic tape, an optical medium such as a CD-ROM and a DVD, a magneto-optical medium such as a floptical disk, and a hardware device specially configured to store and execute a program instruction such as ROM, RAM, and flash memory. An example of the program instruction includes a high-level language code to be executed by a computer using an interpreter or the like as well as a machine code generated by a compiler. The above hardware device may be configured to operate as at least one software module to perform the operations of the embodiments, and vice versa.

According to one embodiment of the present invention, the service server may derive the preliminary right log by preprocessing the usage log, so that the usage log can be matched with a right log for a right holder of the music by accurately defining characteristics and properties of the usage log and ensuring consistency.

According to one embodiment of the present invention, the usage log may be matched with the right log, so that an accurate settlement can be made for the right holder.

According to one embodiment of the present invention, a character string of the preliminary music name may be preprocessed according to a format of the right music name, so that a matching rate can be calculated more accurately.

According to one embodiment of the present invention, the record value of the preliminary right log may be added up on a monthly basis, so that it is possible to respond to music income settlement on a monthly basis.

According to one embodiment of the present invention, the extended derivation may be performed on a right log that has not been a target in the previous steps, so that matching can be performed on a right log that has been omitted by an existing algorithm.

According to one embodiment of the present invention, the preliminary right log in a non-matching state may be derived and stored, so that when matching of the preliminary right log in the non-matching state is performed afterward, a past settlement for the music can be retroactively applied.

According to one embodiment of the present invention, the preliminary right log may be in the non-matching state, which is a state where the usage log is not matched in the master DB and does not exist in the master DB, so that when the master DB is obtained afterward, the matching can be performed.

According to one embodiment of the present invention, one or more notations for a specific artist may be prestored, so that it is possible to respond to an artist name for the specific artist that is variously notated in the streaming server.

According to one embodiment of the present invention, the right log may further include a release date and a release record label, so that a determination criterion may be further set by the service server in consideration of a company name, a title, and the release date under the Copyright Act.

Although the above embodiments have been described with reference to the limited embodiments and drawings, however, it will be understood by those skilled in the art that various changes and modifications may be made from the above-mentioned description. For example, even though the described descriptions may be performed in an order different from the described manner, and/or the described components such as system, structure, device, and circuit may be coupled or combined in a form different from the described manner, or replaced or substituted by other components or equivalents, appropriate results may be achieved.

Therefore, other implementations, other embodiments, and equivalents to the claims are also within the scope of the following claims.

What is claimed is:

1. A method for matching a music usage log (cue sheet) and a copyright holder, which is performed by a service server, wherein the service server includes a master DB, the master DB stores a plurality of right logs identified by a music copyright holder of right music, each of the right logs includes a right music name, a right artist name, and a right album name of the right music, and a cumulative record value obtained by accumulating a record value, which is a number of usage times of the right music, on a monthly basis, and the service server performs:

a usage log reception step of receiving a usage log including a music name, an artist name, an album name, a usage date, and a record value for used music from a streaming server;

a preliminary right log derivation step of deriving a preliminary right log including a preliminary music name, a preliminary artist name, a preliminary album name, a usage month, and a record value, which are obtained by preprocessing the usage log according to a preset rule;

a music name matching rate calculation step of calculating a music name matching rate between each of the right music names of the right logs and the preliminary music name;

an artist name matching rate calculation step of calculating an artist name matching rate between a right artist name of a right log in which the music name matching rate has been calculated as 100% in the music name matching rate calculation step and the preliminary artist name; and a first right log matching step of calculating, when a right log in which the artist name matching rate has been calculated as being greater than or equal to a preset reference artist name matching rate in the artist name matching rate calculation step exists, an album name matching rate between each of the right album names of the right logs and the preliminary album name, deriving a matching right log matched with the preliminary right log based on the artist name matching rate and the album name matching rate, and adding up the record value of the preliminary right log to the cumulative record value of the matching right log, wherein the first right log matching step includes:

a first preliminary matching right log derivation step of calculating the album name matching rate between each of the right album names of the right logs in which the artist name matching rate has been calculated as being greater than or equal to the preset reference artist name matching rate and the preliminary album name, and deriving a right log corresponding to the album name matching rate that is greater than or equal to a preset reference album name matching rate as a first preliminary matching right log; and a first matching step of deriving one of first preliminary matching right logs as the matching right log based on the artist name matching rate and the album name matching rate of each of the first preliminary matching right logs, and adding up the record value of the preliminary right log to the cumulative record value of the matching right log according to the usage month, and wherein, in the method for matching the music usage log and the copyright holder, the service server performs a second right log matching step when a right log in which the artist name matching rate has been calculated as being greater than or equal to the preset reference artist name matching rate in the artist name matching rate calculation step does not exist, and the second right log matching step includes:

a second preliminary matching right log derivation step of calculating the album name matching rate between each of the right album names of the right logs in which the artist name matching rate has been calculated and the preliminary album name, deriving one second preliminary matching right log based on the artist name matching rate and the album name matching rate of each of the right logs corresponding to the album name matching rate that is greater than or equal to a preset reference album name matching rate, calculating and storing a comprehensive matching rate obtained by adding up the music name matching rate, the artist name matching rate, and the album name matching rate of the second preliminary matching right log, and assigning a preset setting comprehensive matching rate to the second preliminary matching right log;

an extended right log derivation step of deriving one or more extended right logs by performing extended derivation on the right logs based on the preliminary right log and the preset rule, and calculating an extended comprehensive matching rate obtained by deriving and adding up the music name matching rate, the artist name matching rate, and the album name matching rate of the extended right log and the preliminary right log;

a second matching step of comparing the setting comprehensive matching rate with an extended comprehensive matching rate corresponding to a largest value among the extended comprehensive matching rates of the one or more extended right logs to derive, when the setting comprehensive matching rate is less than the extended comprehensive matching rate, an extended right log corresponding to the largest value among the extended comprehensive matching rates as the matching right log, and add up the record value of the preliminary right log to the cumulative record value of the matching right log according to the usage month;

a matching rate comparison step of comparing the setting comprehensive matching rate with the extended comprehensive matching rate corresponding to the largest value among the extended comprehensive matching rates of the one or more extended right logs to compare, when the setting comprehensive matching rate is greater than the extended comprehensive matching rate, the setting comprehensive matching rate and the comprehensive matching rate of the second preliminary matching right log;

a non-matching step of storing, when the setting comprehensive matching rate is greater than the comprehensive matching rate in the matching rate comparison step, the preliminary right log in the master DB as non-matching without deriving the second preliminary matching right log as the matching right log; and a third matching step of deriving, when the setting comprehensive matching rate is less than the comprehensive matching rate in the matching rate comparison step, the second preliminary matching right log as the matching right log, and adding up the record value of the preliminary right log to the cumulative record value of the matching right log according to the usage month.

2. The method of claim 1, wherein the preset rule used to derive the extended right log corresponds to one or more of a first rule, a second rule, and a third rule, the first rule corresponds to a rule in which one of the right music name and the preliminary music name includes a remaining one of the right music name and the preliminary music name, the second rule corresponds to a rule in which the right music name and the preliminary music name match each other, and one of the right artist name and the preliminary artist name includes a remaining one of the right artist name and the preliminary artist name, and the third rule corresponds to a rule in which the right music name and the preliminary music name match each other, and one of the right album name and the preliminary album name includes a remaining one of the right album name and the preliminary album name.

3. A service server, which includes a master DB and performs a method for matching a music usage log (cue sheet) and a copyright holder, in which the master DB stores a plurality of right logs identified by a music copyright holder of right music, and each of the right logs includes a right music name, a right artist name, and a right album name of the right music, and a cumulative record value obtained by accumulating a record value, which is a number of usage times of the right music, on a monthly basis, the service server comprising:

a usage log reception unit for receiving a usage log including a music name, an artist name, an album name, a usage date, and a record value for used music from a streaming server;

a preliminary right log derivation unit for deriving a preliminary right log including a preliminary music name, a preliminary artist name, a preliminary album name, a usage month, and a record value, which are obtained by preprocessing the usage log according to a preset rule;

a music name matching rate calculation unit for calculating a music name matching rate between each of the right music names of the right logs and the preliminary music name;

an artist name matching rate calculation unit for calculating an artist name matching rate between a right artist name of a right log in which the music name matching rate has been calculated as 100% in the music name matching rate calculation unit and the preliminary artist name; and a first right log matching unit for calculating, when a right log in which the artist name matching rate has been calculated as being greater than or equal to a preset reference artist name matching rate in the artist name matching rate calculation unit exists, an album name matching rate between each of the right album names of the right logs and the preliminary album name, deriving a matching right log matched with the preliminary right log based on the artist name matching rate and the album name matching rate, and adding up the record value of the preliminary right log to the cumulative record value of the matching right log, wherein the first right log matching unit includes:

a first preliminary matching right log derivation unit for calculating the album name matching rate between each of the right album names of the right logs in which the artist name matching rate has been calculated as being greater than or equal to the preset reference artist name matching rate and the preliminary album name, and deriving a right log corresponding to the album name matching rate that is greater than or equal to a preset reference album name matching rate as a first preliminary matching right log; and a first matching unit for deriving one of first preliminary matching right logs as the matching right log based on the artist name matching rate and the album name matching rate of each of the first preliminary matching right logs, and adding up the record value of the preliminary right log to the cumulative record value of the matching right log according to the usage month, and wherein, in the method for matching the music usage log and the copyright holder, the service server is configured to perform a second right log matching step when a right log in which the artist name matching rate has been calculated as being greater than or equal to the preset reference artist name matching rate in the artist name matching rate calculation unit does not exist, and the second right log matching step includes:

a second preliminary matching right log derivation step of calculating the album name matching rate between each of the right album names of the right logs in which the artist name matching rate has been calculated and the preliminary album name, deriving one second preliminary matching right log based on the artist name matching rate and the album name matching rate of each of the right logs corresponding to the album name matching rate that is greater than or equal to a preset reference album name matching rate, calculating and storing a comprehensive matching rate obtained by adding up the music name matching rate, the artist name matching rate, and the album name matching rate of the second preliminary matching right log, and assigning a preset setting comprehensive matching rate to the second preliminary matching right log;

an extended right log derivation step of deriving one or more extended right logs by performing extended derivation on the right logs based on the preliminary right log and the preset rule, and calculating an extended comprehensive matching rate obtained by deriving and adding up the music name matching rate, the artist name matching rate, and the album name matching rate of the extended right log and the preliminary right log;

a second matching step of comparing the setting comprehensive matching rate with an extended comprehensive matching rate corresponding to a largest value among the extended comprehensive matching rates of the one or more extended right logs to derive, when the setting comprehensive matching rate is less than the extended comprehensive matching rate, an extended right log corresponding to the largest value among the extended comprehensive matching rates as the matching right log, and add up the record value of the preliminary right log to the cumulative record value of the matching right log according to the usage month;

a matching rate comparison step of comparing the setting comprehensive matching rate with the extended comprehensive matching rate corresponding to the largest value among the extended comprehensive matching rates of the one or more extended right logs to compare, when the setting comprehensive matching rate is greater than the extended comprehensive matching rate, the setting comprehensive matching rate and the comprehensive matching rate of the second preliminary matching right log;

a non-matching step of storing, when the setting comprehensive matching rate is greater than the comprehensive matching rate in the matching rate comparison step, the preliminary right log in the master DB as non-matching without deriving the second preliminary matching right log as the matching right log; and a third matching step of deriving, when the setting comprehensive matching rate is less than the comprehensive matching rate in the matching rate comparison step, the second preliminary matching right log as the matching right log, and adding up the record value of the preliminary right log to the cumulative record value of the matching right log according to the usage month.

4. A non-transitory computer-readable medium for implementing a method for matching a music usage log (cue sheet) and a copyright holder, which is performed by a service server, wherein the service server includes a master DB, the master DB stores a plurality of right logs identified by a music copyright holder of right music, each of the right logs includes a right music name, a right artist name, and a right album name of the right music, and a cumulative record value obtained by accumulating a record value, which is a number of usage times of the right music, on a monthly basis, and the non-transitory computer-readable medium stores instructions for allowing the service server to perform:

a usage log reception step of receiving a usage log including a music name, an artist name, an album name, a usage date, and a record value for used music from a streaming server;

a preliminary right log derivation step of deriving a preliminary right log including a preliminary music name, a preliminary artist name, a preliminary album name, a usage month, and a record value, which are obtained by preprocessing the usage log according to a preset rule;

a music name matching rate calculation step of calculating a music name matching rate between each of the right music names of the right logs and the preliminary music name;

an artist name matching rate calculation step of calculating an artist name matching rate between a right artist name of a right log in which the music name matching rate has been calculated as 100% in the music name matching rate calculation step and the preliminary artist name; and a first right log matching step of calculating, when a right log in which the artist name matching rate has been calculated as being greater than or equal to a preset reference artist name matching rate in the artist name matching rate calculation step exists, an album name matching rate between each of the right album names of the right logs and the preliminary album name, deriving a matching right log matched with the preliminary right log based on the artist name matching rate and the album name matching rate, and adding up the record value of the preliminary right log to the cumulative record value of the matching right log, wherein the first right log matching step includes:

a first preliminary matching right log derivation step of calculating the album name matching rate between each of the right album names of the right logs in which the artist name matching rate has been calculated as being greater than or equal to the preset reference artist name matching rate and the preliminary album name, and deriving a right log corresponding to the album name matching rate that is greater than or equal to a preset reference album name matching rate as a first preliminary matching right log; and a first matching step of deriving one of first preliminary matching right logs as the matching right log based on the artist name matching rate and the album name matching rate of each of the first preliminary matching right logs, and adding up the record value of the preliminary right log to the cumulative record value of the matching right log according to the usage month, and wherein, in the method for matching the music usage log and the copyright holder, the service server performs a second right log matching step when a right log in which the artist name matching rate has been calculated as being greater than or equal to the preset reference artist name matching rate in the artist name matching rate calculation step does not exist, and the second right log matching step includes:

a second preliminary matching right log derivation step of calculating the album name matching rate between each of the right album names of the right logs in which the artist name matching rate has been calculated and the preliminary album name, deriving one second preliminary matching right log based on the artist name matching rate and the album name matching rate of each of the right logs corresponding to the album name matching rate that is greater than or equal to a preset reference album name matching rate, calculating and storing a comprehensive matching rate obtained by adding up the music name matching rate, the artist name matching rate, and the album name matching rate of the second preliminary matching right log, and assigning a preset setting comprehensive matching rate to the second preliminary matching right log;

an extended right log derivation step of deriving one or more extended right logs by performing extended derivation on the right logs based on the preliminary right log and the preset rule, and calculating an extended comprehensive matching rate obtained by deriving and adding up the music name matching rate, the artist name matching rate, and the album name matching rate of the extended right log and the preliminary right log;

a second matching step of comparing the setting comprehensive matching rate with an extended comprehensive matching rate corresponding to a largest value among the extended comprehensive matching rates of the one or more extended right logs to derive, when the setting comprehensive matching rate is less than the extended comprehensive matching rate, an extended right log corresponding to the largest value among the extended comprehensive matching rates as the matching right log, and add up the record value of the preliminary right log to the cumulative record value of the matching right log according to the usage month;

a matching rate comparison step of comparing the setting comprehensive matching rate with the extended comprehensive matching rate corresponding to the largest value among the extended comprehensive matching rates of the one or more extended right logs to compare, when the setting comprehensive matching rate is greater than the extended comprehensive matching rate, the setting comprehensive matching rate and the comprehensive matching rate of the second preliminary matching right log;

a non-matching step of storing, when the setting comprehensive matching rate is greater than the comprehensive matching rate in the matching rate comparison step, the preliminary right log in the master DB as non-matching without deriving the second preliminary matching right log as the matching right log; and a third matching step of deriving, when the setting comprehensive matching rate is less than the comprehensive matching rate in the matching rate comparison step, the second preliminary matching right log as the matching right log, and adding up the record value of the preliminary right log to the cumulative record value of the matching right log according to the usage month.

* * * * *